United States Patent
Swann et al.

(10) Patent No.: US 11,643,978 B2
(45) Date of Patent: May 9, 2023

(54) METHOD OF CONTROLLING AIRCRAFT VAPOUR TRAILS AND PROPULSION SYSTEM PROVIDING FOR CONTROL OF AIRCRAFT VAPOUR TRAILS

(71) Applicant: ROLLS-ROYCE plc, London (GB)

(72) Inventors: Peter Swann, Derby (GB); Christopher P Madden, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/570,433

(22) Filed: Jan. 7, 2022

(65) Prior Publication Data

US 2022/0235716 A1 Jul. 28, 2022

(30) Foreign Application Priority Data

Jan. 25, 2021 (GB) ..................................... 2100940

(51) Int. Cl.
*F02C 9/28* (2006.01)
*F23R 3/34* (2006.01)
*F02C 7/22* (2006.01)

(52) U.S. Cl.
CPC ............... *F02C 9/28* (2013.01); *F23R 3/343* (2013.01); *F02C 7/22* (2013.01); *F05D 2220/323* (2013.01); *F05D 2270/07* (2013.01); *F05D 2270/13* (2013.01); *F05D 2270/303* (2013.01); *F05D 2270/311* (2013.01); *F05D 2270/313* (2013.01); *F05D 2270/335* (2013.01)

(58) Field of Classification Search
CPC ......... F02C 9/28; F23R 3/343; F05D 2270/13
See application file for complete search history.

(56) References Cited

U.S. PATENT DOCUMENTS

| 9,399,521 B2 | 7/2016 | Swann |
| 9,896,218 B2 | 2/2018 | Swann |

(Continued)

FOREIGN PATENT DOCUMENTS

GB    2473722 A    3/2011

OTHER PUBLICATIONS

Jul. 21, 2021 Search Report issued in British Patent Application No. 2100940.2.

(Continued)

*Primary Examiner* — Katheryn A Malatek
(74) *Attorney, Agent, or Firm* — Oliff PLC

(57) ABSTRACT

An aircraft including lean-burn gas turbine engines operating in pilot-plus-mains mode with a given initial fuel flow $W_0$, a method of controlling the optical depth of contrails produced by a first group of engines includes the steps of (i) reducing fuel flow to each engine in the first group to change the operation of each engine from pilot-plus-mains mode to pilot-only mode, and (ii) adjusting fuel flow to one or more engines in a second group of engines such that the total fuel flow to engines of the second group is increased, all engines of the second group remaining in pilot-plus-mains mode, and wherein the set of lean-burn engines consists of the first and second groups. Depending on atmospheric conditions, the average optical depth of contrails produced by the engines may be enhanced or reduced compared to when all engines operate in pilot-plus-mains mode with a fuel flow $W_0$.

20 Claims, 20 Drawing Sheets

(56) References Cited

U.S. PATENT DOCUMENTS

| | | | |
|---|---|---|---|
| 10,259,590 B2 | 4/2019 | Swann | |
| 2010/0263382 A1* | 10/2010 | Mancini | F23R 3/14 |
| | | | 60/742 |
| 2015/0284102 A1 | 10/2015 | Swann | |
| 2015/0284103 A1* | 10/2015 | Swann | F02C 9/42 |
| | | | 701/3 |
| 2017/0268782 A1* | 9/2017 | Huang | F02C 9/26 |
| 2019/0032559 A1* | 1/2019 | Dai | F23R 3/343 |

OTHER PUBLICATIONS

Jun. 27, 2022 Extended Search Report issued in European Patent Application No. 22150415.2.

Kleine et al., "In Situ Observations of Ice Particle Losses in a Young Persistent Contrail," The 3rd EAA European Congress on Acoustics (Forum Acusticum 2002), John Wifey & Sons, Inc, Sevilia, Spain, vol. 45, Dec. 28, 2018.

Kärcher, Bernd. "Formation and Radiative Forcing of Contrail Cirrus," Nature Communications, (2018).

Bier, A., & Burkhardt, U. "Variability in Contrail Ice Nucleation and Its Dependence on Soot Number Emissions," Journal of Geophysical Research: Atmospheres, 3384-3400, (2019).

Khou et al., "Numerical Study of the Impact of Aircraft Geometry on Contrail Formation," American Institute of Aeronautics and Astronautics Inc., (2013).

* cited by examiner

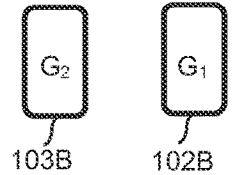
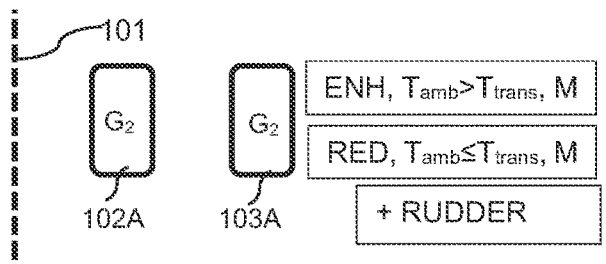
Fig. 19C
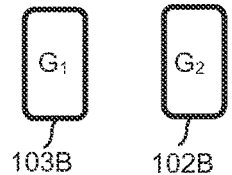
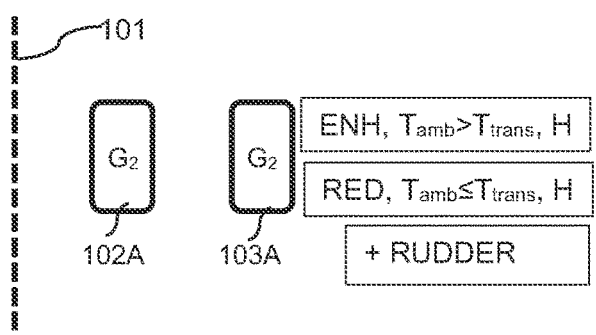
Fig. 19D
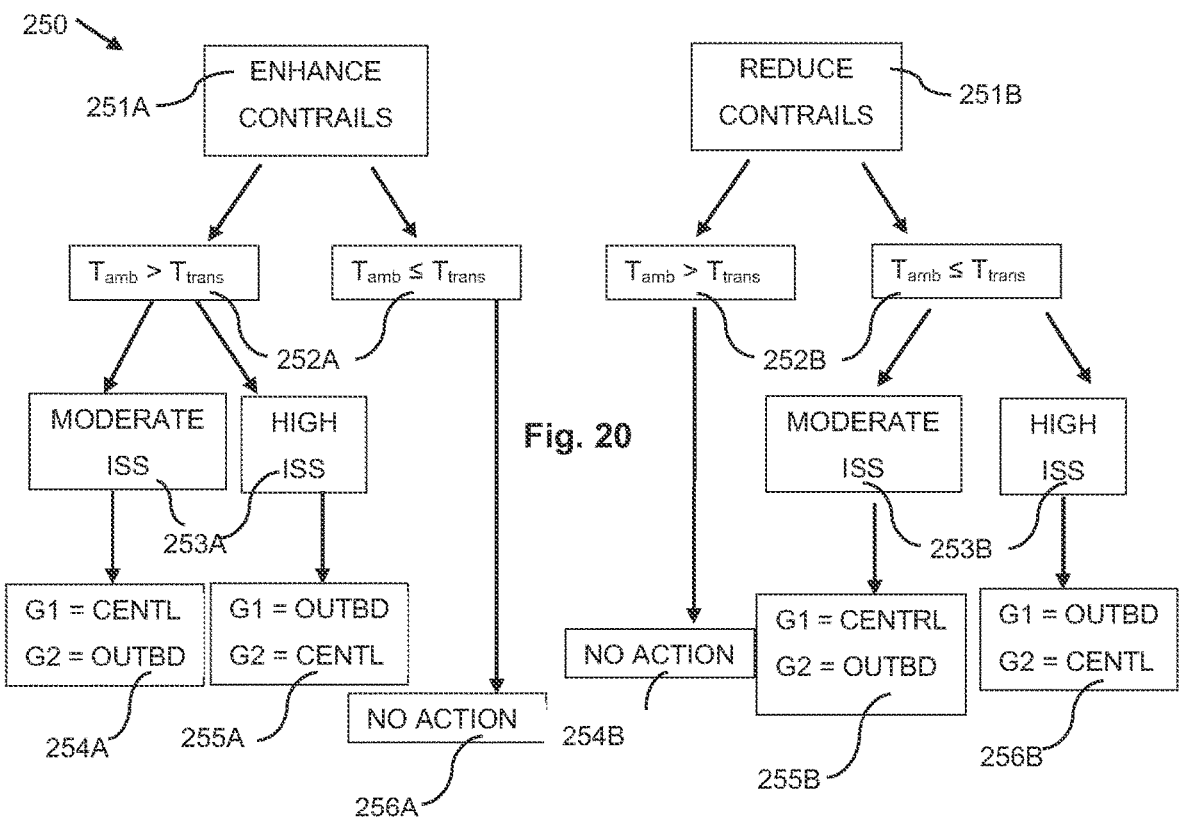
Fig. 20

METHOD OF CONTROLLING AIRCRAFT VAPOUR TRAILS AND PROPULSION SYSTEM PROVIDING FOR CONTROL OF AIRCRAFT VAPOUR TRAILS

CROSS-REFERENCE TO RELATED PATENT APPLICATIONS

This application is based upon and claims the benefit of priority from British Patent Application No. GB2100940.2, filed on Jan. 25, 2021, the entire contents of which are hereby incorporated by reference.

BACKGROUND OF THE INVENTION

Field of the Invention

The disclosure relates to methods of controlling aircraft vapour trails (condensation trails or "contrails") and to aircraft propulsion systems providing for control of aircraft vapour trails.

Description of Related Art

Vapour trails (also known as condensation trails or contrails) are line-shaped ice clouds which can form behind aircraft propelled by gas turbine engines under certain conditions. If ambient conditions support persistence of a contrail, it can spread to resemble natural cirrus cloud. Contrails and contrail-cirrus are collectively referred to as aircraft-induced cloudiness (AIC).

AIC has two impacts on the radiative budget of the earth. On the one hand it can reflect incoming sunlight back into space, exerting a cooling effect on the surface below. The cooling effect applies only during the day when there is sunlight to reflect away. On the other hand, AIC captures infrared radiation which might otherwise escape from the Earth to space, retaining the energy as heat which can lead to a warming effect. The warming effect applies both day and night. For the pattern of aviation activity existing during for example the year 2019, the net effect of aviation"s overall AIC is believed to be a substantial trapping of heat energy, similar in magnitude to that of the accumulated atmospheric $CO_2$ attributable to aviation. Nonetheless, for an individual contrail, the life-cycle impact may be warming or cooling depending on a number of factors including whether the contrail exists primarily at night or primarily during the day.

According to the well-known Schmidt-Appleman criterion, a contrail can form if the local relative humidity over water (RHw) exceeds a threshold at some point during the process of mixing of engine exhaust air with ambient air. A further requirement is the existence of suitable condensation nuclei providing surfaces for condensation to start. The value of the threshold depends upon the characteristics of the condensation nuclei. Typically, soot particles created during incomplete combustion of fuel within a gas turbine engine can act as potential condensation nuclei (following coating with aqueous sulphuric acid), and the corresponding RHw threshold, established experimentally, is approximately 100%. It is known that the proportion of emitted soot particles which become activated as condensation nuclei is influenced by the extent to which local RHw exceeds the determined threshold (Kärcher et al, *Nature Communications* 9 (2018), article number 1824, DOI: 10.1038/s41467-018-04068-0; Bier et al, *Journal of Geophysical Research: Atmospheres*, 124, https://doi.org/10.1029/2018JD029155).

Due to low ambient atmospheric temperatures typically encountered at aircraft cruise altitudes, the initially-formed droplets quickly freeze to form ice particles.

Exhaust plumes of engines located sufficiently close to an aircraft"s wingtips will become at least partially entrained in the aircraft"s wingtip vortices. Contrail ice particles entrained in a wingtip vortex are subject to adiabatic heating due to descent of the vortex. As a result, ice mass can be lost from the surface of the entrained ice particles via sublimation, leading to elimination of some of the particles, thereby leading to a reduction in the optical depth of the contrail downstream of the vortex. This effect is particularly evident in the case of relatively large or heavy aircraft for which the wingtip vortices are strong in nature. This effect is less evident when ambient air is highly supersaturated with respect to ice.

Depending on the location of an engine relative to the aircraft"s wingtips, the exhaust flow of the engine can become entrained to a greater or lesser extent within a wingtip vortex. Simulation results have suggested that, in comparison with contrails produced by outboard engines, contrails produced by inboard engines interact less strongly with wingtip vortices and that contrails produced by engines mounted very close to the aircraft"s centreline interact much less strongly with wingtip vortices. Hence there is a distinction between outboard and inboard engines, as far as interaction with wingtip vortices is concerned, particularly where the inboard engines are very close to an aircraft"s longitudinal centreline. Other research has confirmed that there is a difference in the level of interaction with the wingtip vortices of the exhaust plumes of engines mounted at different positions along the wings of an aircraft (Khou et al, "Numerical Study of the Impact of Aircraft Geometry on Contrail Formation", *International Symposium on Air-Breathing Engines* (2013), 1321). Based on the results of CFD studies it has been established that the jets of outboard engines of a four-engine aircraft are more quickly and more effectively entrained into the trailing vortex than those of the inboard engines, or those of two-engined aircraft.

Within a vortex, contrail ice particles experience an initial depositional growth phase, followed by a sublimation phase as the vortex descends and adiabatic compression (and hence heating) takes place. The duration and effectiveness of the initial depositional growth phase is strongly influenced by ambient relative humidity levels. As a result, there is a strong dependency upon ambient relative humidity over ice (RHi) of the proportion of contrail ice particles which survive a wingtip vortex. For small levels of ambient ice super-saturation (for example RHi between 100% and 110%) the proportion of contrail ice particles surviving the vortex may be small. For larger levels of ambient ice super-saturation (for example RHi exceeding approximately 130% or 140%), a majority of ice particles initially captured within the wingtip vortex may avoid elimination by sublimation.

Ice particles which survive the wingtip-vortex make up a contrail whose vertical extent is greatly increased, perhaps to several hundred metres, as a result of wingtip-vortex interaction. In the presence of ambient wind-shear, a vertically-large contrail can also spread laterally, increasing its geographical coverage. Therefore, in some cases, a contrail"s climate impact can be increased by the wingtip vortex interaction (WVI), while in others, it can be decreased by the wingtip vortex interaction because elimination of ice particles is a more significant effect than spatial spreading.

U.S. Pat. No. 9,399,521 discloses a method and apparatus for reducing the aircraft-averaged optical depth of contrails, and hence their climate-warming impact, for a cruising aircraft having more than two engines. This is achieved by re-distributing thrust between inboard and outboard engines by altering fuel flow rates to the engines and hence their soot (or non-volatile particulate matter, nVPM) emission indices. A net reduction in contrail optical depth is achieved by exploiting the different extent to which contrails of an individual engine can become entrained in the aircraft"s wing tip vortices depending on the position of the engine on the aircraft. The invention is particularly directed to rich-burn engines and assumes that more soot particles (nvPM) result in increased optical depth of a contrail, although this is not invariably the case.

U.S. Pat. No. 9,896,218 discloses a method and apparatus for preventing formation of contrails under a limited range of circumstances. Thrust is re-distributed so as to materially alter the efficiency of an aircraft"s engines. The efficiency of an engine can be altered by exploiting the inherent variation of the engine"s specific fuel consumption (SFC) as a function of thrust setting at a constant forward velocity (giving rise to curves known as SFC loops).

In some circumstances it may be desirable to increase the aircraft-averaged optical depth of contrails produced by an aircraft, rather than reduce it, in order to increase their climate-cooling effect. It is therefore desirable to be able either to increase or to decrease aircraft-averaged contrail optical depth depending on prevailing or projected circumstances, however the extent to which this can be achieved using techniques of the prior art is limited.

BRIEF SUMMARY

According to a first example, in an aircraft comprising a set of lean-burn gas turbine engines each operating in pilot-plus-mains mode with a given initial fuel flow, a method of controlling the optical depth of contrails produced by a first group of the lean-burn gas turbine engines comprises the steps of:
  (i) reducing fuel flow to each engine in the first group to change the operation of each engine in the first group from pilot-plus-mains mode to pilot-only mode; and
  (ii) adjusting fuel flow to one or more engines in a second group of the lean-burn gas turbine engines such that the total fuel flow to engines of the second group is increased, all engines of the second group remaining in pilot-plus-mains mode;
wherein the set of lean-burn engines consists of the first and second groups.

An increase in emissions of non-volatile particulate matter, or soot, produced by engines of the first group, when operation of the engines of the first group is changed from pilot-plus-mains mode to pilot-only mode, leads to either an increase or a decrease in the optical depth of contrails depending on atmospheric conditions.

As used herein, optical depth is a measure of how much electromagnetic radiation, optionally in certain wavelength ranges, is prevented from travelling through a region. In the case of a contrail or ice cloud, optical depth is influenced primarily by ice particle number density, effective ice particle radius, and the physical thickness of the contrail or ice cloud. Since most contrails are optically thin their radiative forcing is approximately proportional to their optical depth.

Steps (i) and (ii) are preferably carried out such that the total thrust and aircraft pitch- and yaw-moments produced by the set of lean-burn gas turbine engines are conserved. Additional aircraft drag resulting from deployment of aircraft control surfaces which would otherwise be needed to compensate additional yaw- and pitch-moments is avoided and the forward velocity of the aircraft remains constant such that changes in optical depths of contrails produced by engines of the first and second groups depend directly (although not necessarily linearly) on the changes in fuel flow to engines of the first and second groups.

Where the set of lean-burn gas turbine engines of the aircraft consists of a sub-set of inboard engines and a sub-set of outboard engines, the first and second groups may be the sub-sets of inboard and outboard engines respectively, with steps (i) and (ii) being carried out when the relative humidity over ice of air through which the aircraft is flying is between approximately 100% and approximately 120%. Contrails of engines of the first group of engines are enhanced when the ambient temperature of air through which the aircraft is flying is greater than a transition temperature and reduced when the ambient temperature is less than or equal to the transition temperature, the transition temperature being the air temperature required to allow non-soot particles within the engines" exhausts to become activated as water condensation nuclei.

Alternatively, where the set of lean-burn gas turbine engines of the aircraft consists of a sub-set of inboard engines and a sub-set of outboard engines, the first and second groups may be the sub-sets of outboard and inboard engines respectively, with steps (i) and (ii) being carried out when the relative humidity over ice of air through which the aircraft is flying is at least 120% or at least 130%. Contrails of engines of the first group of engines are enhanced when the ambient temperature of air through which the aircraft is flying is greater than the transition temperature and reduced when the ambient temperature is less than or equal to the transition temperature.

Steps (i) and (ii) may be carried out such that at least one of a change in aircraft yaw-moment and a change in aircraft pitch-moment is produced by the set of lean-burn gas turbine engines and the method further comprises the steps of:
  (iii) adjusting one or more flight control surfaces of the aircraft to compensate for the change in aircraft yaw-moment and/or the change in aircraft pitch-moment produced by the set of lean-burn gas turbine engines; and
  (iv) adjusting the total thrust produced by the set of lean-burn gas turbine engines to compensate for any change in aircraft drag resulting from carrying out step (iii) in order to maintain the forward velocity of the aircraft.

Where the set of lean-burn gas turbine engines of the aircraft consists of a sub-set of inboard engines and a sub-set of outboard engines, the first and second groups may be a single inboard engine and all engines other than the single inboard engine respectively, with steps (i) and (ii) being carried out when the relative humidity over ice of air through which the aircraft is flying is either (a) between approximately 100% and approximately 120% or (b) at least 120% or at least 130%. The optical depth of contrails produced by engines of the first group are enhanced when the ambient air temperature is greater than the transition temperature and reduced when the ambient air temperature is less than or equal to the transition temperature.

Alternatively, where the set of lean-burn gas turbine engines of the aircraft consists of a sub-set of inboard engines and a sub-set of outboard engines, the first and second groups may be a single outboard engine and all engines other than the single outboard engine respectively, with steps (i) and (ii) being carried out when the relative humidity over ice of the air through which the aircraft is flying is at least 120% or at least 130%. The optical depth of contrails produced by engines of the first group are enhanced when the ambient air temperature is greater than the transition temperature and reduced when the ambient air temperature is less than or equal to the transition temperature.

If the set of lean-burn engines consists of a first engine and a second engine, each of which is mounted on a respective lateral side of the aircraft, the first and second engines being substantially equidistant from the central longitudinal axis of the aircraft, then the first and second groups may consist of the first engine and the second engine respectively, or alternatively the first and second groups may consist of the second engine and the first engine respectively. The optical depth of contrails produced by the engine of the first group is enhanced when the ambient air temperature is greater than the transition temperature and reduced when the ambient air temperature is less than or equal to the transition temperature.

The method may comprise the step of determining the set of all possible engine groupings, each grouping being one way of assigning one or more of the lean-burn engines to the first group and the remaining engines to the second group, and for each engine grouping:
  (a) determining or selecting an upper limit $W_U$ and a lower limit $W_L$ for the fuel flow to each engine of the first group to be implemented upon carrying out step (i), the upper limit being less than or equal to a fuel flow corresponding to the fuel staging point of the engines;
  (b) determining or selecting a set of fuel flow values for engines of the first group between the upper and lower limits, the set of fuel flow values including the upper and lower limits;
  (c) for each fuel flow value determined or selected in step (b) determining a respective fuel flow value for each engine of the second group such that a given fuel flow value for engines of the first group and a corresponding set of respective fuel flow values for engines of the second group provide for the forward velocity of the aircraft to be maintained if implemented in steps (i) and (ii) together with adjustment of one or more flight control surfaces of the aircraft it necessary;
  (d) for each fuel flow value in the set of fuel flow values for engines of the first group determined or selected in step (b), and the corresponding respective fuel flow values for engines of the second group determined in step (c), calculating (606) the value of a cost function based on the fuel use and $CO_2$, and optionally $NO_x$, emissions of the set of lean-burn gas turbine engines and the climate impact of contrails produced by said engines per unit flight distance; and
  (e) determining the fuel flow value of the first group, and the corresponding respective fuel flow values for engines of the second group resulting in the smallest value of the cost function for the engine grouping under consideration and storing data corresponding to that engine grouping and those fuel flows;
and subsequently (f) selecting and implementing in steps (i) and (ii) the engine grouping, the fuel flow value of the first group, and the corresponding set of fuel flow values for engines of the second group, which result in the lowest cost function value.

Steps (a) to (e) may be repeated:
  (a) continuously;
  (b) after a particular engine grouping, a particular fuel flow rate for engines of the first group and a corresponding set of respective fuel flow rates for engines of the second group have been implemented in step (f);
  (c) after elapse of a pre-determined time period; or
  (d) following a change in at least one of requested thrust level, ambient temperature, ambient humidity, forecast ambient atmospheric conditions and time of day, the magnitude of the change exceeding a pre-determined threshold value;
and a new combination of engine grouping and fuel flow for engines of the first group implemented in step (f) if that combination has a lower cost function than that of a currently-implemented combination of engine grouping and fuel flow for engines of the first group.

The lower limit $W_L$ for fuel flow to each engine of the first group for a given engine grouping may be determined by the steps of:
  (a) determining the maximum thrust per engine which can be provided by engines of the second group and the corresponding maximum thrust which can be provided by the second group of engines;
  (b) determining the minimum thrust which would need to be provided by the first group of engines in order to maintain the forward velocity of the aircraft if the maximum thrust determined in step (a) were to be implemented, and the corresponding thrust per engine of the first group;
  (c) calculating the engine-attributable aircraft yaw-moment and engine-attributable aircraft pitch-moment which would result from implementing the thrusts per engine determined in steps (a) and (b); and
  (d) setting a value of total aircraft yaw-moment equal to the engine-attributable yaw-moment and a value of total aircraft pitch-moment equal to the engine-attributable pitch-moment; and whilst the total aircraft yaw-moment and/or aircraft pitch-moment calculated in step (d) exceeds a pre-determined threshold:
  (e) calculating a required flight control surfaces setting necessary to achieve substantially zero total aircraft yaw-moment and substantially zero total aircraft pitch-moment and a corresponding value of flight control surfaces drag;
  (f) determining a new minimum thrust per engine of the first group required to maintain the velocity of the aircraft taking into account the flight control surfaces drag; and
  (g) re-calculating the engine-attributable aircraft yaw-moment and the engine-attributable aircraft pitch-moment based on the new minimum thrust determined in step (f);
  (h) calculating the total aircraft yaw-moment based on the engine-attributable aircraft yaw-moment and the total aircraft pitch-moment based on the engine-attributable pitch-moment determined in step (g) and the flight control surfaces drag;
and subsequently determining a fuel flow rate corresponding to the minimum thrust per engine of the first group finally determined in step (f) and setting the lower limit $W_L$ equal to that fuel flow rate.

Alternatively, the value of the lower limit $W_L$ may be one of:
  (a) a predetermined fixed value or a pre-determined percentage of the initial fuel flow to each engine of the set of lean-burn engines;
  (b) a value which is a pre-determined function of the initial fuel flow to each engine of the set of lean-burn engines;
  (c) a value consistent with a pre-determined minimum level of operation of engines of the first group;

(d) a value based on the cardinalities of the first and second groups and a maximum tolerable fuel flow for engines of the second group which ensures that a maximum operating temperature or spool speed is not exceeded for engines of the second group; and (e) a value which is a function of a sensed condition indicative of abnormal engine operation.

The upper limit $W_U$ may be a pre-determined percentage of the fuel flow corresponding to the fuel staging point of the engines.

The step of calculating the value of a cost function based on the fuel use and $CO_2$ emissions of the set of lean-burn turbofan engines and the climate impact of contrails produced by the set of lean-burn turbofan engines per unit flight distance for a given engine grouping, a given fuel flow value for engines of the first group and a corresponding set of fuel flow values for engines of the second group may comprise the steps of:

(a) calculating the engine-specific or engine-group-specific soot particle number per unit contrail length for engines of the first and second groups;

(b) calculating the engine-specific or engine-group-specific proportion of soot particles produced by the engine or group which are activated as condensation nuclei for engines of the first and second groups;

(c) calculating the number of non-soot originating condensation nuclei per unit contrail length for engines of the first and second groups;

(d) calculating the engine-specific or engine-group-specific post-vortex contrail properties of contrails produced by engines of the first and second groups; and (e) converting the engine-specific or engine-group-specific post-vortex contrail properties into an engine-specific or engine-group-specific climate impact per unit distance of flight using a metric or exchange rate.

The fuel flows to engines in the first and second groups may be adjusted to either:

(a) enhance the optical depth of contrails produced by engines of the first group only during a period between the start-time of a daylight period and a time equal to the end-time of the daylight period minus a pre-determined maximum likely lifetime of an enhanced contrail; or (b) reduce the optical depth of contrails produced by engines of the first group only during a period between the end-time of a daylight period and a time equal to the start-time of the next daylight period minus a pre-determined maximum likely lifetime of a reduced contrail.

According to a second example, a propulsion system for an aircraft comprises:

(i) a set of lean-burn gas turbine engines;

(ii) a fuel metering system arranged to adjust fuel flow to each of the lean-burn gas turbine engines;

(iii) a sensing system arranged to sense the temperature and relative humidity over ice of air through which the aircraft may fly and generate corresponding first data; and (iv) a control and decision-making unit;

wherein the control and decision-making unit is arranged to receive the first data from the sensing system and second data corresponding to an initial thrust level for each engine of the set individually or all engines of the set collectively, carry out processing using the first and second data and provide control signals to the fuel-metering system either directly, or via a plurality of engine electronic controllers each of which is arranged to control a respective engine of the set of lean-burn gas turbine engines, to effect a method according to the first example.

According to a third example, an aircraft comprises a propulsion system according to the second example.

BRIEF DESCRIPTION OF THE SEVERAL VIEWS OF THE DRAWINGS

Examples are described below with reference to the accompanying drawings in which:

FIGS. 19A-D show four groupings of the engines of the FIG. 5 aircraft into first and second groups for achieving enhancement or reduction of contrails produced by the aircraft;

FIG. 20 shows a flow chart illustrating control of the engines of the aircraft of FIG. 12 to enhance or reduce contrails produced by the aircraft;

DETAILED DESCRIPTION

Figure 1:
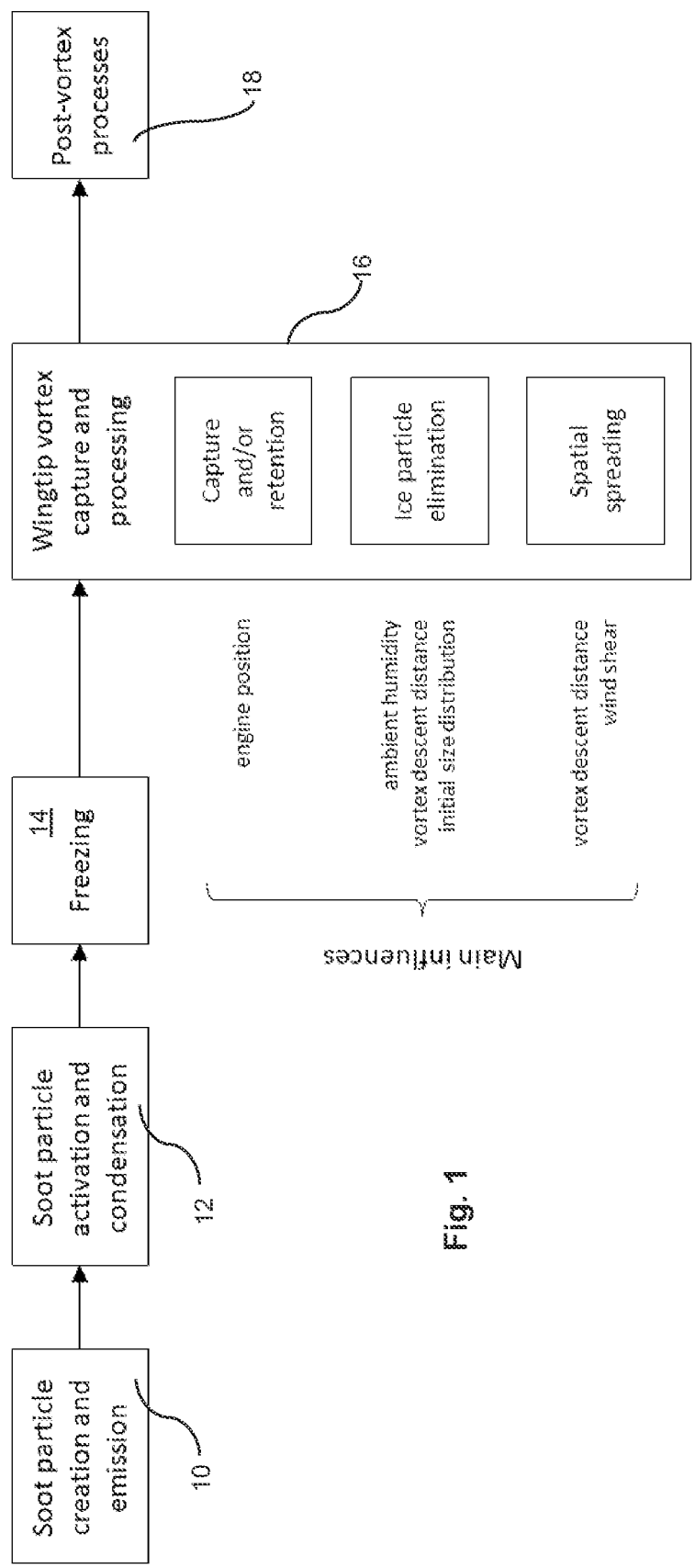
FIG. 1 shows a sequence of processes by which a contrail produces an impact on the earth"s climate.

For a scenario in which emitted soot particles act as a primary source of contrail condensation nuclei, FIG. 1 shows a sequence of processes contributing to the climate impact of a contrail. Soot particles are initially formed in the combustor of an engine and emitted as part of the engine"s exhaust plume (10). Depending on conditions within the exhaust plume as it mixes with ambient air, none, some or substantially all of the emitted soot particles then become activated as condensation nuclei, allowing water vapour in the exhaust plume to condense onto those nuclei, forming soot-containing water-droplets (12). Subsequent freezing, due to low ambient temperatures, results in formation of ice particles (14). A proportion of the ice particles then become captured and processed within a wingtip vortex of the aircraft (16). The proportion of pre-vortex ice particles which are captured by the vortex is determined at least in part by the position of the engine relative to a wingtip of the aircraft. The duration of retention of captured ice particles within the wingtip vortex is also determined at least in part by the position of the engine relative to a wingtip of the aircraft. The duration of retention is also limited by the lifetime of the vortex itself prior to its breakup. Within the core of the wingtip vortex, a parcel of air containing captured ice particles is isolated from ambient air for a period of time. During the moments following initial capture of an air parcel, the circulatory air movement associated with the vortex causes within the isolated air parcel a reduction in pressure and hence a cooling leading to an increase in local relative humidity over ice (RHi), leading to growth of the captured ice particles in order to return local RHi within the captured air parcel towards 100%. However, descent of the vortex behind the aircraft causes compression of the air parcel and adiabatic heating thereof. This process, unlike the initial loss of pressure as circulatory motion of the captured air parcel is established, is ongoing throughout the lifetime of the vortex and quickly dominates over the initial rarefaction and cooling. As a result, following the initial growth phase described above, ice mass is lost by sublimation from the surface of the ice particles for the remainder of the period of retention within the vortex. As ice mass is lost from the surface of ice particles, initially smaller particles are more likely to be eliminated completely due to loss of all of their ice mass, while initially larger particles survive for longer and may outlive the wingtip vortex. The extent of compression experienced by a captured air parcel within a wingtip vortex is influenced by the vertical distance through which the vortex descends during the time that the air parcel remains captured. Noting that there is little heat transfer between ambient air and the vortex core, the compression experienced by the vortex core as it descends is largely adiabatic and also is isentropic. A well-known isentropic adiabatic relationship gives the temperature change in an air parcel (excluding latent heat effects associated with sublimation of ice). Noting that the contents of the vortex core are fairly well isolated from ambient air during the vortex lifetime, the mass fraction of water (in all its phases, including both gas and solid) within a captured air parcel is substantially unchanging during the descent of the vortex. It follows that if the initial mass fraction of water is high, then a greater distance of descent, and hence a greater extent of heating of the air parcel, will be required before all of the captured ice mass can be turned to vapour. Conversely, for a certain distance of descent, a higher initial water mass fraction is likely to reduce the fraction of captured/entrained ice particles that become eliminated within the vortex. Subsequent, post-vortex processes (18), for example contrail spreading due to wind shear, also affect climate impact.

The initial water mass fraction of a captured air parcel is influenced by the water mass fraction of ambient air (which for a given ambient temperature is influenced by ambient relative humidity), the water mass emission index of the fuel, and the dilution ratio at the point where the air parcel is captured by the wingtip vortex. The dilution ratio is defined as the ratio of the mass of an air parcel to the mass of fuel whose combustion products are contained in the air parcel.

Since the vortex descends at an approximately constant vertical rate, the vertical distance through which a captured air parcel (and its associated ice particles) descends is related to the duration of retention. Thus the lifetime of the vortex prior to its breakup largely determines the vertical extent of the post-vortex contrail. After taking account of heat energy required to achieve sublimation of ice from entrained ice particles, the temperature of a captured air parcel following descent within the vortex will nonetheless be higher than that of ambient air at the same altitude. Captured air which is released from the vortex, either due to premature detrainment or due to vortex breakup, will thus bounce back upwards and can even rise to a height above the aircraft"s cruising height. This further increases the vertical extent of the contrail. A contrail which has been spread vertically by wingtip vortex interaction is susceptible to horizontal spreading due to ambient wind shear (if present), which means that the contrail may cover a greater proportion of the sky as a result.

In ambient air which is only modestly ice-super-saturated (ISS) (e.g. RHi between 100% and 110%), the proportion of captured contrail ice particles which survive the aircraft"s wingtip vortices can be very low, perhaps even close to zero in some cases. This leads to a reduction in the magnitude of a contrail"s climate impact. Conversely, in ambient air which is highly ice-supersaturated (e.g. RHi of approximately 130%), the surviving proportion may be very high. In conjunction with the spatial spreading effect of the wingtip vortex interaction, this can increase the magnitude of a contrail"s climate impact.

Figure 2:
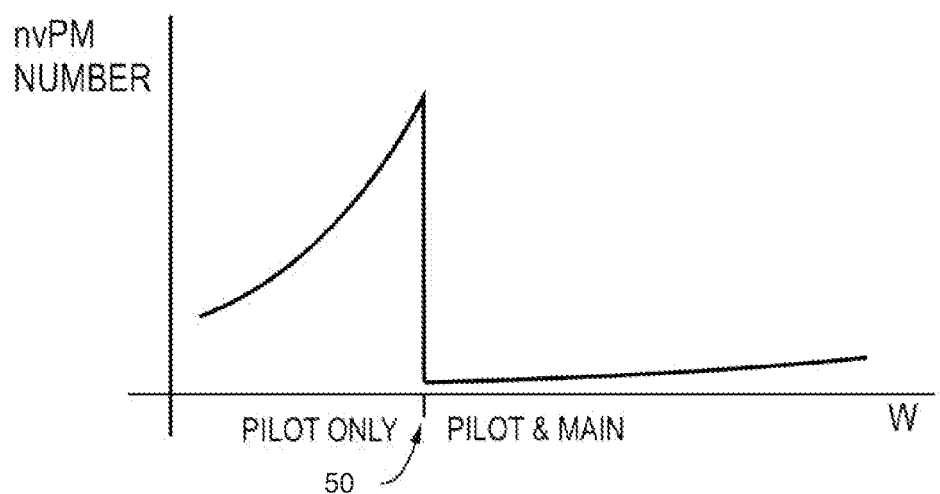
FIG. 2 shows the relationship between fuel flow rate and soot particle (non-volatile particulate matter) number emission rate for a lean-burn combustor of a turbofan engine.

FIG. 2 shows the relationship between fuel flow rate and soot particle emission-rate (shown as "non-volatile particulate matter (nvPM) number") for a lean-burn combustor. The figure shows a first region, to the left of a fuel flow threshold, or staging point 50, in which only the combustor"s pilot burners are operating, and in which nvPM number rises rapidly (exponentially or approximately exponentially) with increasing fuel flow rate W. Operation in this first region will be referred to as "pilot-only" mode. In a second region, to the right of the staging point 50, both the pilot burners and the main burners are operating, and nvPM number is much lower and rises only slowly (if at all) with increasing fuel flow rate W. Operation in this second region will be referred to as "pilot and main" or "pilot-plus-mains" mode.

Typically the position of the fuel staging point 50 is chosen such that the fuel flow rate during most or all cruise conditions falls to the right of fuel staging point 50, i.e. in a region in which the main burners are operating and in which nvPM number is very low.

As will be described below, the present invention does not change an aircraft"s airspeed. Therefore, in the context of the present invention, a percentage change in the number of soot particles emitted by an engine per unit time corresponds to the same percentage change in the number of soot particles emitted by the same engine per unit distance of aircraft travel through the air, and thus per unit length of any contrail that may be formed by the corresponding engine.

Figure 3:
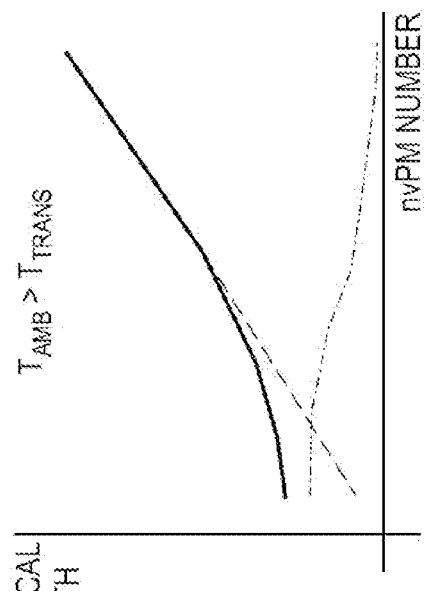

FIG. 3 shows a variation of contrail optical depth with emitted non-volatile particulate matter (nvPM) number, in a first regime corresponding to ambient temperatures $T_{amb}$ lying above a transition temperature $T_{trans}$; contrail optical depth monotonically increases with increasing nvPM number throughout the range of nvPM number shown.

Figure 4:
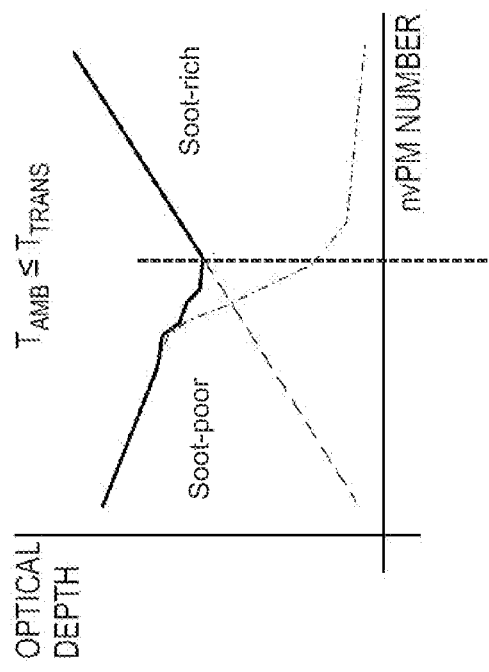
FIGS. 3 & 4 show (solid line) the variation of contrail optical depth with non-volatile particulate matter (nvPM) number for two atmospheric ambient temperature regimes.

FIG. 4 shows a variation of contrail optical depth with emitted non-volatile particulate matter (nvPM) number in a second regime corresponding to ambient temperatures $T_{amb}$ less than or equal to the transition temperature $T_{trans}$. Above a critical value $n_c$ of nvPM number, increasing nvPM number results in increasing contrail optical depth. For nvPM values below $n_c$, decreasing nvPM number also results in increasing contrail optical depth. The region of FIG. 4 where nvPM is above $n_c$ is known as the soot-rich region of FIG. 4, whilst the region where nvPM number is below $n_c$ is known as the soot-poor region. In the case of the soot-rich region of FIG. 4, soot particles preferentially become activated as water condensation nuclei, allowing condensation and hence depletion of local ice supersaturation to proceed, and in so doing they largely prevent other potential condensation nuclei from becoming activated. However, if soot particles are present in only small numbers, as is the case for the soot-poor region of FIG. 4, other forms of potential condensation nuclei can become activated in the second regime due to adequate levels of relative humidity being reached within the mixing exhaust plume of an engine.

The transition temperature is not a fixed value—it is simply the ambient temperature which is required to enable a sufficiently high relative humidity to be reached during mixing of exhaust with ambient air in order to allow non-soot particles to become activated as water condensation nuclei. Accordingly, the transition temperature will depend upon physico-chemical properties of the non-soot particles and upon the gradient of a mixing line representing the mixing process from the exhaust plume to ambient conditions and upon the water vapour partial pressure of ambient air at the prevailing flight conditions.

Figure 5:
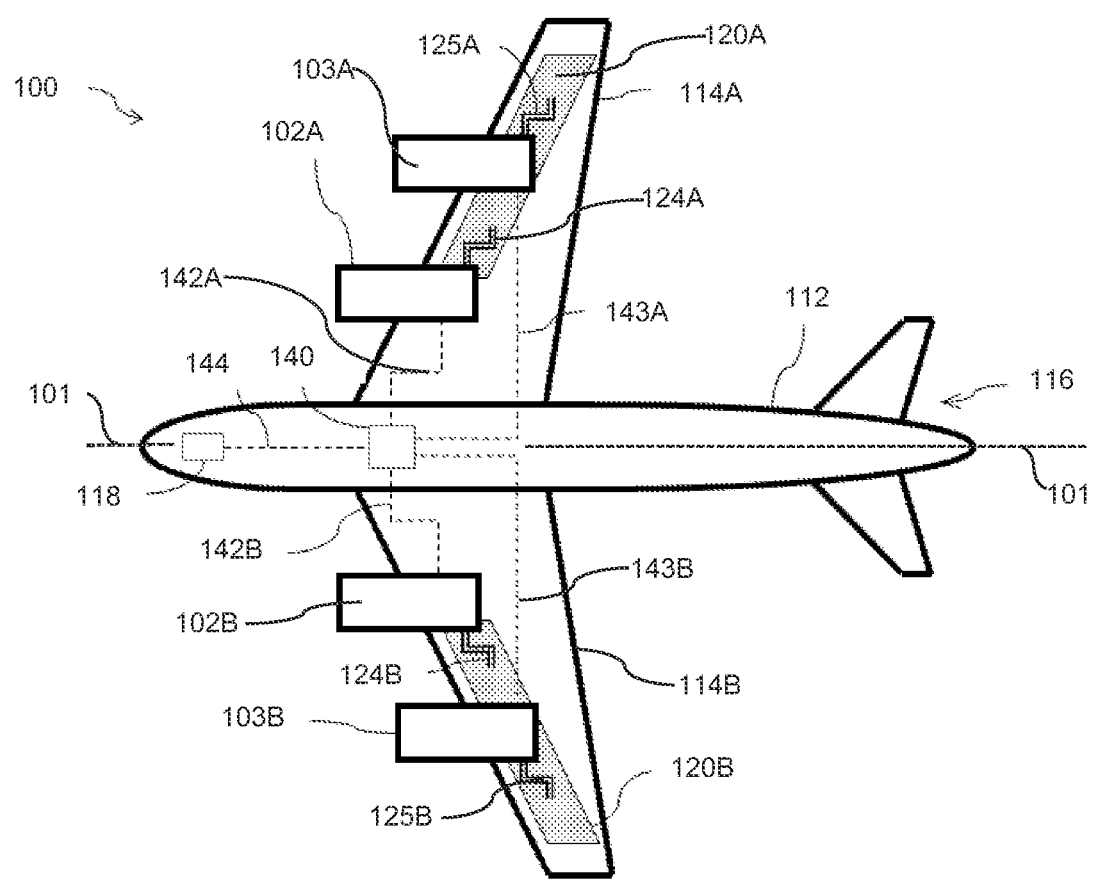
FIG. 5 shows a plan view of a first example aircraft.

Referring to FIG. 5, a first example aircraft 100 comprises a fuselage 112, wings 114A, 114B, fuel-tanks 120A, 120B, an empennage or tail-assembly 116, a cockpit 118 and inboard 102A, 102B and outboard 103A, 103B lean-burn turbofan engines mounted to the wings 114A, 114B as shown. Each lean-burn turbofan engine 102A, 102B, 103A, 103B has a nvPM v fuel flow characteristic of the form shown in FIG. 2. Although the fuel-tanks 120A, 120B are shown mounted exclusively in the wings, in other examples there may be other fuel-tank locations.

Each lean-burn turbofan engine 102A, 102B, 103A, 103B is configured to draw fuel or receive fuel from one or more of the fuel tanks 120A, 120B via one or more fuel supply pipes 124A, 124B, 125A, 125B. Details such as cross-feed fuel-lines are not shown. Each inboard engine 102A, 102B is connected via a respective signal communication means 142A, 142B with a control and decision-making unit 140. Each outboard engine 103A, 103B is connected via a respective signal communication means 143A, 143B with the control and decision-making unit 140. The control and decision-making unit 140 is configured to receive via signal communication means 144 signals from the cockpit 118 specifying for each engine individually or all engines concurrently a desired thrust level, or a proxy for a desired thrust level such as an angle of one or more thrust levers in the cockpit 118, or one or more desired rotational speeds of propulsive fans of the engines 102A, 102B, 103A, 103B. The control and decision-making unit 140 receives input signals from sensors (not shown) detecting ambient air temperature and relative humidity over ice (RHi). Signal communication means 142A, 142B, 143A, 143B couple outputs from the control and decision-making unit 140 to the lean-burn turbofan engines 102A, 102B, 103A, 103B respectively, controlling fuel flow to each engine 102A, 102B, 103A, 103B by means of a fuel-metering system (not shown), and hence the thrust of each engine 102A, 102B, 103A, 103B in accordance with the invention. Each engine may comprise a respective electronic controller which receives a respective output signal from the control and decision-making unit 140 and determines fuel flow to the engine"s combustor in dependence upon desired thrust (or a proxy for desired thrust) and other factors such as the engine"s current operating state.

Control of aircraft-averaged contrail optical depth for the aircraft 100 under various conditions is described with reference to Examples 1-6 below.

Example 1

If the ambient relative humidity over ice (RHi) is less than 100%, i.e. if there is no ambient ice supersaturation (ISS), then contrails produced by the engines 102A, 102B, 103A, 103B are short-lived, and therefore no action need be taken either to enhance or to reduce the optical depth of the contrails.

Example 2

Figure 6:
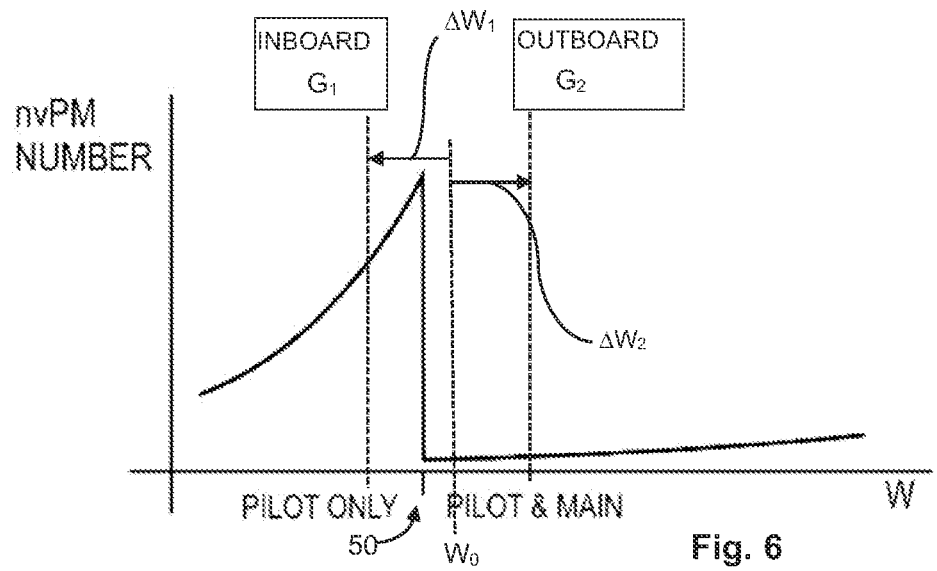
FIGS. 6 to 11 illustrate methods of controlling contrails produced by the FIG. 5 aircraft.

FIG. 6 illustrates how the optical depth of contrails produced by the aircraft 100 of FIG. 4 may be enhanced in a case where the ambient relative humidity over ice (RHi) is modestly above 100%, (i.e. modest ambient ice supersaturation, ISS) for example between 100% and 110%, and the ambient air temperature $T_{amb}$ is above the transition temperature $T_{trans}$ (i.e. optical depth v nvPM number has the form shown in FIG. 3), starting from an operational condition in which the fuel flow to each of the engines 102A, 103A, 102B, 103B has a value $W_0$ which is modestly above the engine fuel staging point 50, as may occur at an end-of-cruise flight segment for example. It can for example be desirable to increase the optical depth of a contrail persisting during daylight hours in order to increase the amount of solar radiation reflection back into space by the contrail. The fuel flow to each engine of a first group $G_1$ of engines consisting of the inboard engines 102A, 102B is changed by an amount $\Delta W_1$ (which is negative, i.e. the fuel flow to each engine in $G_1$ is reduced) such that these engines are switched from the pilot-plus-mains mode of operation to the pilot-only mode of operation, increasing their soot (nvPM) emission indices. In order to conserve total thrust, and hence the forward velocity and altitude of the aircraft 100, the fuel flow to each of a second group $G_2$ of engines consisting of the outboard engines 103A, 103B is changed by an amount $\Delta W_2$ (which is positive and in general has a magnitude different to that of $\Delta W_1$); this has very little effect on the soot (nvPM) emission indices of engines of the second group $G_2$ of engines because these engines remain in the pilot-plus-mains mode of operation. Thus the optical depths of contrails produced by the inboard engines 102A, 102B are increased, whilst the optical depths of contrails produced by the outboard engines 103A, 103B do not significantly change. An alternative possibility would be to assign the outboard engines 103A, 103B to the first group $G_1$ such that the fuel flow rates to these engines are reduced and to assign the inboard engines 102A, 102B to the second group $G_2$ such that the fuel flow rates to these engines are increased. However, this possibility would have relatively little effect on contrail optical depth under the conditions mentioned above. The optical depth of contrails produced by the inboard engines 102A, 102B would increase very little since they would remain in the pilot-plus-mains mode of operation. The optical depth of contrails produced by the outboard engines would also increase by very little since a majority of ice crystals produced within the contrails of the outboard engines 103A, 103B would not survive heating and sublimation within the wing tip vortices due to the modest ambient RHi value (approximately between 100% and 110%).

Example 3

Figure 7:
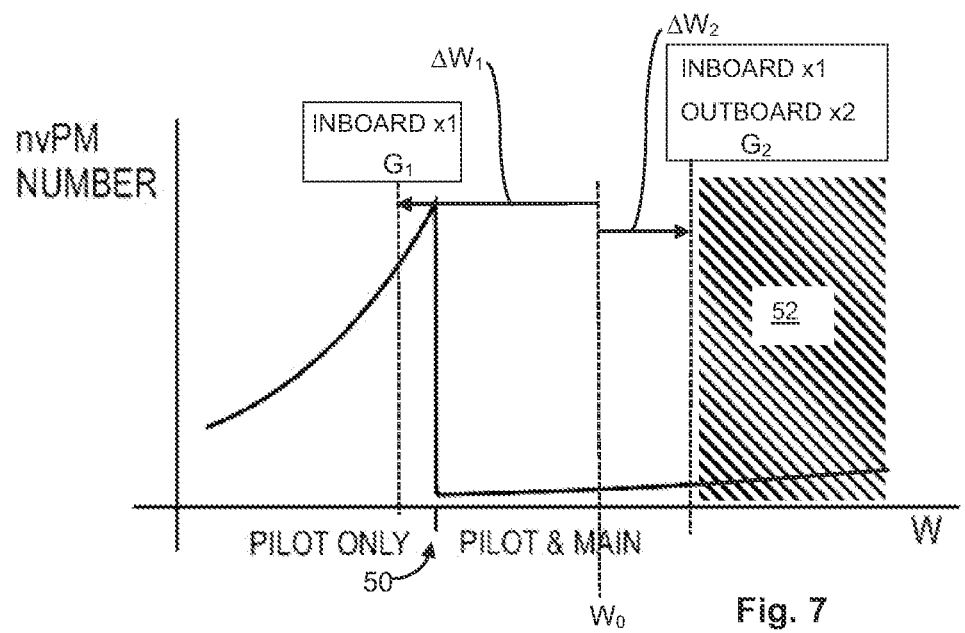

FIG. 7 illustrates how the aircraft-average optical depth of contrails of the aircraft 100 of FIG. 5 may be increased in atmospheric conditions similar to those described above in relation to FIG. 6, but where the initial fuel flow $W_0$ to each engine 102A, 102B, 103A, 103B is significantly higher than that corresponding to the staging point 50, as may be the case at the start of cruise flight segment or start of a step climb for example. In this situation the scope for increasing the fuel flow to each of the outboard engines 103A, 103B is typically limited owing to operational constraints of the engines, for example there may be a limitation on the operating temperature of a part of an engine. In FIG. 7, a forbidden (or at least undesirable) range of fuel flow rate W is indicated by a hatched area 52. Given the relatively large change $\Delta W_1$ in fuel flow required to place each of the inboard engines 102A, 102B into pilot-only mode, thrust cannot be conserved by changing (increasing) the fuel flow rate to each of the outboard engines 103A, 103B by a similar amount $\Delta W_2$ whilst simultaneously avoiding the forbidden range 52. In this case a single inboard engine, e.g. 102A, is assigned to the first group $G_1$ and the other inboard engine, e.g. 102B, is assigned to the second group $G_2$ together with the two outboard engines 103A, 103B. Since only one engine is assigned to the first group $G_1$, rather than two, and since three engines are assigned to the second group $G_2$, rather than two, the fuel flow change (increase) $\Delta W_2$ for each of these engines is small enough for the forbidden region 52 to be avoided. Total thrust is therefore conserved although there is an engine-attributable aircraft yaw-moment about a yaw axis of the aircraft 100 and there may also be an engine-attributable aircraft pitch-moment about a pitch axis of the aircraft 100; this can be compensated for by aircraft flight control surfaces adjustment, and/or by redistributing thrust within the second group, but without moving any to the region 52 or switching any to pilot-only operation. Since adjustment of flight control surfaces to compensate for engine-attributable aircraft yaw-moment and/or engine-attributable aircraft pitch-moment increases aircraft drag, the total thrust produced by the inboard 102A, 102B and outboard 103A, 103B engines must be slightly increased over that of the starting condition of the aircraft 100 (i.e. relative to the initial condition in which all engines have a fuel flow $W_0$) in order to maintain the forward velocity and altitude of the aircraft 100.

Example 4

Figure 8:
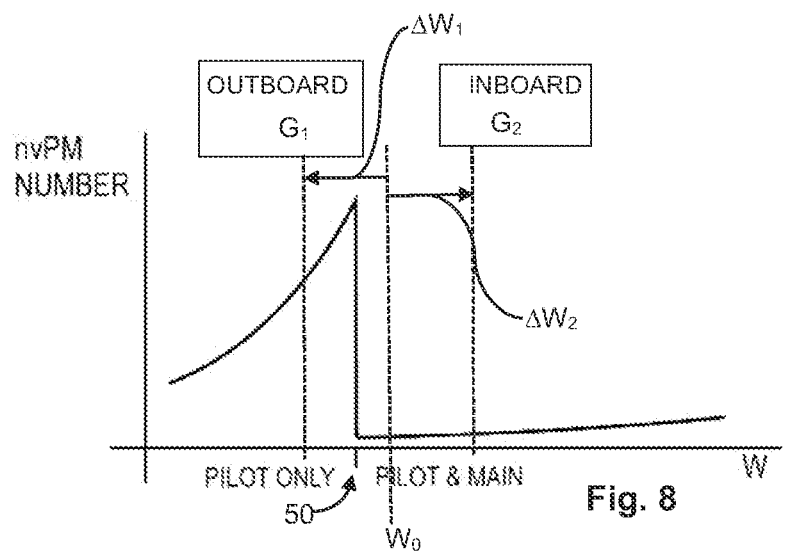

FIG. 8 illustrates how the optical depth of contrails produced by the aircraft 100 of FIG. 4 may be enhanced in a case where the ambient relative humidity over ice (RHi) is significantly above 100% (i.e. there is high ambient ice supersaturation, ISS), for example approximately 130%, the ambient air temperature $T_{amb}$ is above the transition temperature $T_{trans}$ (i.e. optical depth v nvPM number has the form shown in FIG. 3) and where there is some wind-shear, starting from an operational condition in which the fuel flow to each of the engines 102A, 103A, 102B, 103B has a value $W_0$ which is modestly above the engine staging point 50, as may occur at end-of-cruise for example. The outboard engines 103A, 103B are assigned to a first group $G_1$ of engines, each of which has its fuel flow rate reduced by an amount $\Delta W_1$, switching these engines from the pilot-plus-mains mode of operation to the pilot-only mode of operation; the inboard engines 102A, 102B are assigned to a second group $G_2$ each of which has its fuel flow rate increased by an amount $\Delta W_2$; these engines remain in the pilot-plus-mains mode of operation.

Resulting additional soot (nvPM) produced by engines of the first group $G_1$ (i.e. the outboard engines 103A, 103B) provides an increase in nucleation sites for ice crystals to form. Due to the relatively high ambient ice supersaturation (ISS), i.e. ambient RHi of around 130%, a high proportion of ice crystals within contrails of the outboard engines 103A, 103B survive adiabatic heating within the wing tip vortices, and the effect of changing operation of the outboard engines 103A, 103B from pilot-plus-mains to pilot-only operation is to substantially increase the optical depth of contrails produced by the outboard engines 103A, 103B. Assigning the outboard engines 103A, 103B to the first group $G_1$ (fuel reduction) and the inboard engines 102A, 102B to the second group $G_2$ (fuel increase) is more effective at increasing contrail optical depth under the conditions mentioned above than assigning the inboard engines 102A, 102B to $G_1$ (fuel reduction) and the outboard engines 103A, 103B to $G_2$ (fuel increase). In this example (Example 4) the post-wingtip-vortex contrails of outboard engines 103A, 103B are enhanced due to relatively high ambient RHi whereas in Example 2, post-wingtip-vortex contrails of outboard engines 103A, 103B cannot be enhanced to the same extent, if at all, due to the modest ambient RHi and elimination of a high proportion of formed ice particles within the wing tip vortices. Wing tip vortex interaction is stronger for contrails of the outboard engines 103A, 103B than for contrails of the inboard engines 102A, 102B.

Example 5

Figure 9:
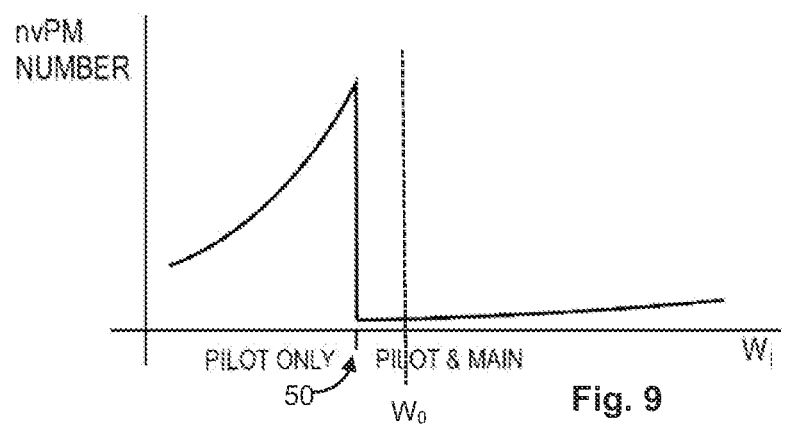

FIG. 9 illustrates a condition where the initial fuel flow $W_0$ to each of the four engines 102A, 102B, 103A, 103B has a value greater to some general extent than that corresponding to the staging point 50. If the intention is to reduce the optical depth of the contrails produced by the engines 102A, 102B, 103A, 103B starting from this condition, with any value of ambient RHi (i.e. any value of ambient ice supersaturation, ISS) and with ambient temperature $T_{amb}$ greater than the transition temperature $T_{trans}$, then no adjustment to the fuel flows of the engines 102A, 102B, 103A, 103B is needed as the optical depth of the contrails is already substantially minimised: all the engines 102A, 102B, 103A, 103B therefore remain in the pilot-plus-mains mode of operation.

Example 6

Figure 10:
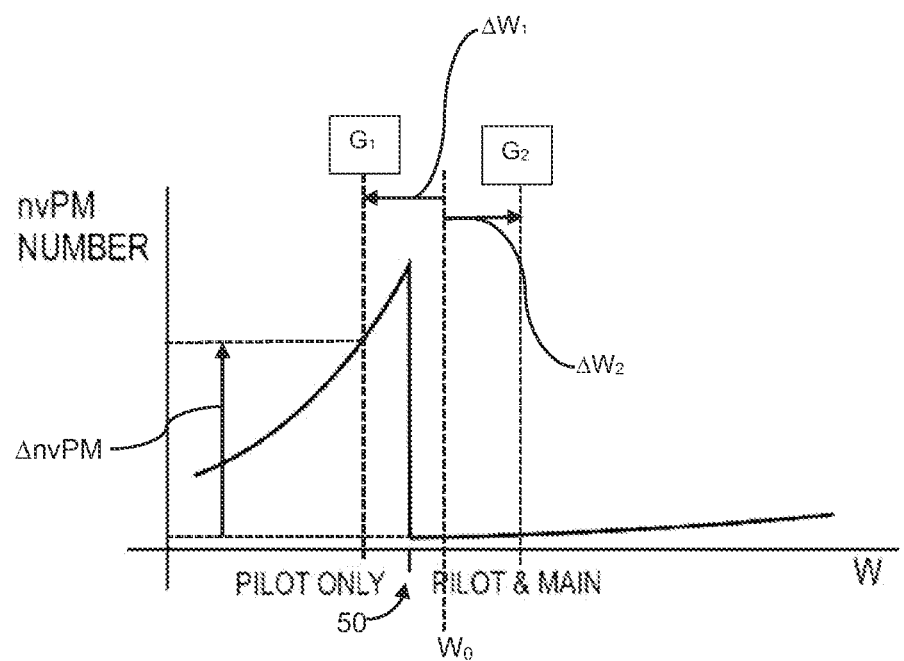
Figure 11:
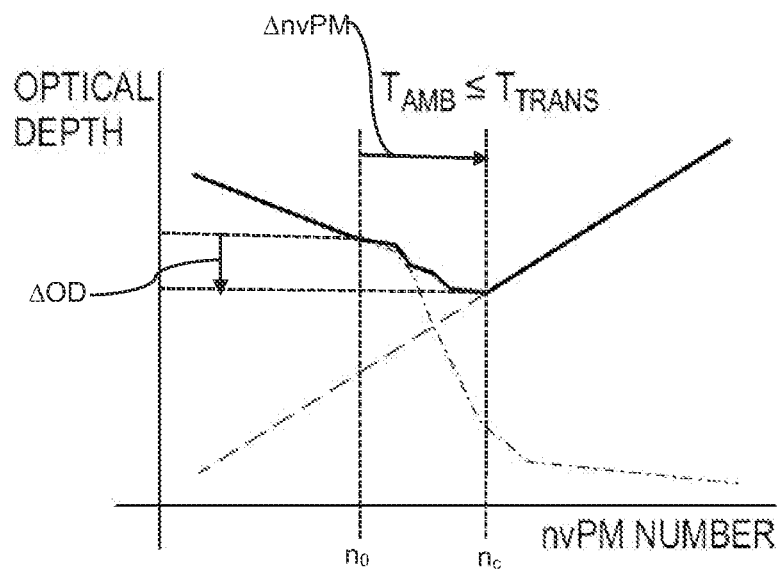

FIGS. 10 and 11 illustrate control of contrails of the aircraft 100 of FIG. 5 starting from a condition in which fuel flow $W_0$ to each engine 102A, 102B, 103A, 103B is greater than that corresponding to the staging point 50, the ambient temperature $T_{amb}$ is less than or equal to the transition temperature $T_{trans}$ and the ambient RHi is either modestly above 100%, for example between 100% and 110% (modest ambient ice supersaturation, ISS), or significantly above 100%, such as 130% for example (i.e. moderate or high ambient ice supersaturation, ISS). Also, referring specifically to FIG. 11, the initial fuel flow rate $W_0$ to each engine 102A, 102B, 103A, 103B corresponds to an initial nvPM number $n_0$ below the critical value $n_c$, i.e. $n_0$ is in the soot-poor region of FIG. 11.

In order to reduce the aircraft-averaged contrail optical depth when ambient RHi is modestly above 100% (i.e. modest ambient ice supersaturation, ISS), for example between 100% and 110%, the fuel flow W to each of a first group $G_1$ of engines consisting of the inboard engines 102A, 102B is reduced by an amount $\Delta W_1$ such that these engines are switched from pilot-plus-mains operation to pilot-only operation. In order to conserve the forward velocity and altitude of the aircraft 100, the fuel flow to each of a second group $G_2$ of engines consisting of the outboard engines 103A, 103B is increased by an amount $\Delta W_2$. An increase $\Delta$nvPM in nvPM number of the inboard engines 102A, 102B causes a reduction $\Delta$OD in optical depth of contrails produced by the inboard engines 102A, 102B. The nvPM number of the outboard engines 103A, 103B (assigned to the second group $G_2$) changes relatively little as these engines remain in a pilot-plus-mains mode of operation and therefore the optical depths of contrails produced by the outboard engines 103A, 103B remain substantially unchanged. Since the RHi value in this case is modestly above 100%, sublimation of ice particles within the wing tip vortices is significant, particularly for contrails of the outboard engines 103A, 103B. Reduction in aircraft-averaged contrail optical depth is therefore more efficiently achieved by increasing nvPM number for the inboard engines 102A, 102B than by increasing nvPM number for the outboard engines 103A, 103B.

To reduce the aircraft-averaged contrail optical depth in a case where ambient RHi is substantially above 100%, e.g. 130%, (i.e. high ambient ice supersaturation, ISS) the outboard engines 103A, 103B are assigned to a first group $G_1$ of engines to each of which fuel flow is reduced by $\Delta W_1$ and the inboard engines 102A, 102B are assigned to a second group $G_2$ of engines to each of which each fuel flow is increased by $\Delta W_2$ to conserve total thrust provided by all engines 102A, 102B, 103A, 103B, and hence maintain the forward velocity and altitude of the aircraft 100. Due to the relatively high value of ambient RHi of 130% for example, ice particles tend to survive wingtip vortex interaction and contrails formed by the outboard engines 103A, 103B can experience spatial spreading to a greater extent than the contrails formed by inboard engines 102A, 102B, and therefore contrail optical depth for the aircraft 100 as a whole can be more effectively reduced by increasing the nvPM number associated with the outboard engines 103A, 103B than by increasing the nvPM number associated with the inboard engines 102A, 102B.

When reducing the fuel flow to each engine in the first group $G_1$, the nvPM number is preferably made equal to $n_c$ in order to maximise reduction in contrail optical depth. This may involve reducing the fuel flow W of an engine in the first group $G_1$ to a value well below the staging point 50 which may not always be possible if there are constraints on the fuel flow increase that can be applied to engines of the second group $G_2$ due to, for example, engine operating temperature considerations. As described above in relation to Example 3, one engine may be assigned to $G_1$ and three engines to $G_2$, with engine-attributable aircraft yaw-moment and/or engine attributable aircraft pitch-moment being compensated for by aircraft flight control surfaces adjustment and/or by thrust re-distribution within $G_2$, and total thrust being increased slightly compared to the initial thrust in order to compensate for additional drag introduced by any flight control surfaces adjustment.

Figure 12:
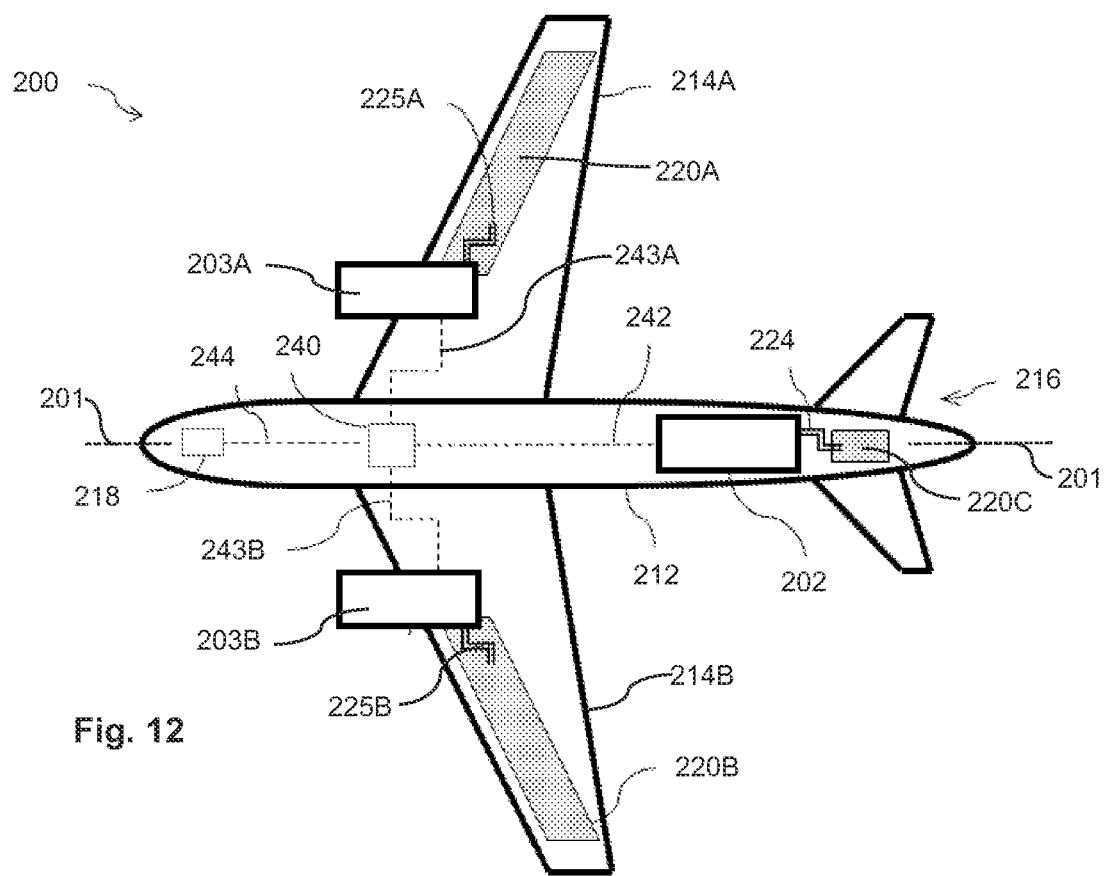
FIG. 12 shows a plan view of a second example aircraft.

Referring now to FIG. 12, a second example aircraft, being an aircraft having three lean-burn turbofan engines 202, 203A, 203B, is indicated generally by 200. Parts of the aircraft 200 which correspond to parts of the aircraft 100 of FIG. 5 are labelled with reference numerals differing by 100 from those labelling the corresponding parts in FIG. 5. The aircraft 200 has one fuselage-mounted engine 202 and two wing-mounted engines 203A, 203B. The wing-mounted engines 203A, 203B are closer to the tips of wings 214A, 214B respectively than is the fuselage-mounted engine 202. Engines 203A, 203B are therefore outboard engines and the single, central, fuselage-mounted engine 202 is an inboard engine. An additional fuel-tank 220C is also shown, exclusively supplying fuel to the inboard engine 202, although it is to be understood that other fuel-tank arrangements are contemplated, for example a fuel-tank arrangement in which the inboard engine draws fuel from one or both of the wing-mounted fuel tanks 220A, 220B.

Examples 7 and 8 below illustrate control of aircraft-averaged contrail optical depth for the aircraft 200 of FIG. 12.

Example 7

Figure 13:
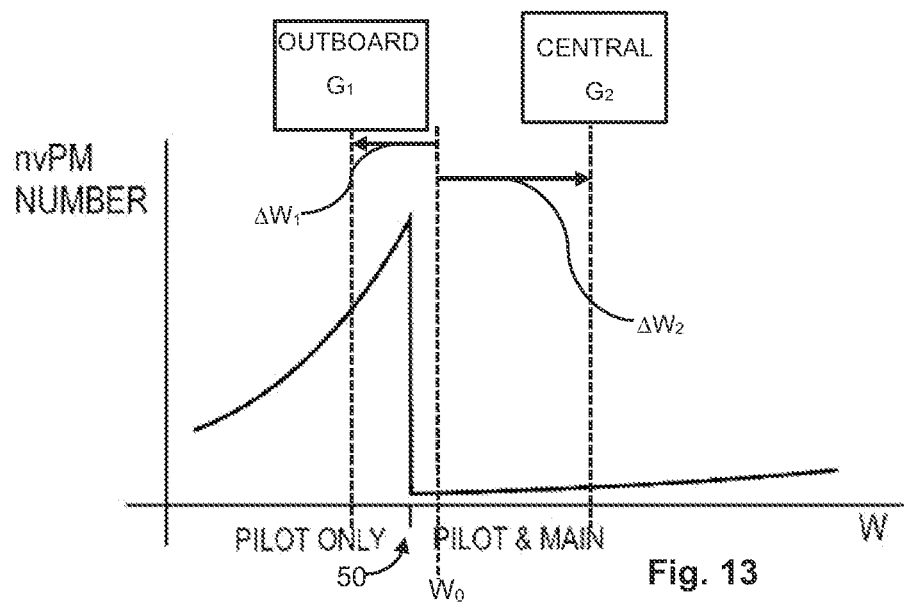
FIGS. 13 & 14 illustrate methods of controlling contrails produced by the FIG. 12 aircraft.

FIG. 13 indicates how contrails of the aircraft 200 may be enhanced, i.e. the aircraft-averaged contrail optical depth increased, in a case where the fuel flow to each of the engines 202, 203A, 203B has an initial value $W_0$ greater than that corresponding to the staging point 50, the ambient temperature $T_{amb}$ is greater than the transition temperature $T_{trans}$ and the ambient relative humidity over ice (RHi) is significantly greater than 100%, for example 130% (high ambient ice supersaturation, ISS), such that elimination of ice particles within a wing tip vortex is not as significant an effect as spreading of the contrail due to descent of the vortex and possible wind-shear. In this case the outboard, wing-mounted engines 203A, 203B are assigned to a first group $G_1$ and the fuel flow to each of these engines is changed by $\Delta W_1$ (i.e. reduced) to switch them from pilot-plus-mains operation to pilot-only operation. The fuel flow to the single, central, fuselage-mounted engine 202 is increased by $\Delta W_2$, corresponding to a thrust increase which matches the combined thrust decrease of the wing-mounted engines 203A, 203B in order to maintain the total thrust provided by the engines 202, 203A, 203B and hence maintain the velocity and altitude of the aircraft 200. Increased nvPM number in contrails associated with the outboard engines 203A, 203B (due to switching from pilot-plus-mains operation to pilot-only operation) enhances these contrails, whereas the contrail associated with the single inboard, fuselage mounted engine 202 is not significantly changed as the engine 202 remains in the pilot-plus-mains mode of operation.

If fuel flow to the central, single, inboard engine 202 cannot be increased sufficiently to compensate for reduction in thrust provided by the outboard engines 203A, 203B (for example due to a constraint on engine operating temperature) then the inboard engine 202 may instead be assigned to $G_1$ (fuel reduction $\Delta W_1$) and the outboard engines to $G_2$ (fuel increase $\Delta W_2$), although this will be somewhat less effective in enhancing the aircraft-averaged contrail optical depth as there is only a single inboard engine 202 and furthermore a contrail of the central, single, inboard engine 202 may experience a lower degree of spatial spreading than those of the outboard engines 203A, 203B due to differences in the extent of wingtip-vortex interaction.

In either case, adjustments to flight control surfaces may be required to compensate for any material changes in engine-attributable aircraft pitch-moment, and a small adjustment in total thrust may be required to balance the corresponding change in flight control surface drag.

Example 8

Figure 14:
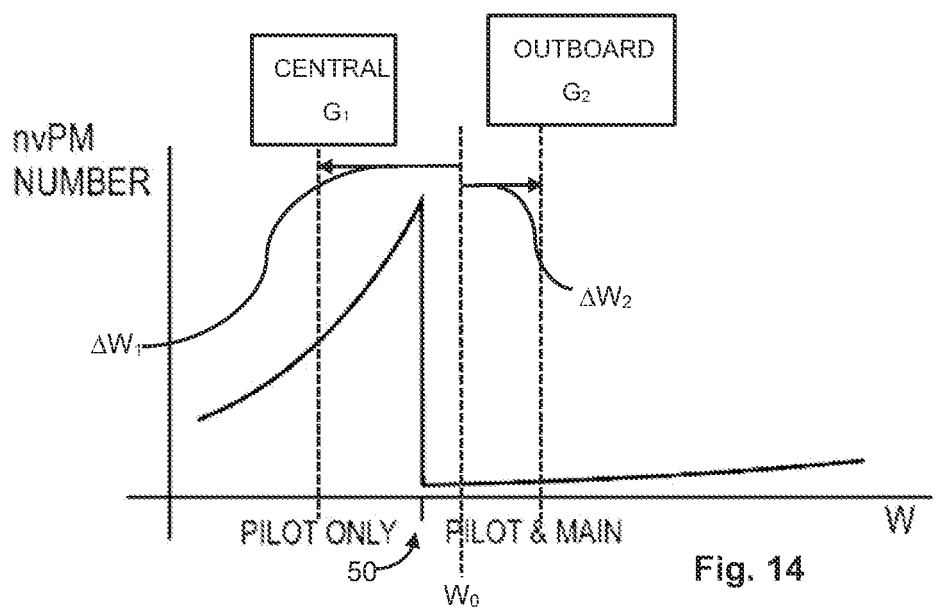

Referring to FIG. 14, if initial atmospheric and aircraft conditions are the same as those of Example 7, except that RHi is only modestly above 100%, e.g. between 100% and 110% (modest ice supersaturation, ISS), then aircraft-averaged contrail optical depth is most effectively increased by assigning the inboard, central engine 202 to group $G_1$ (fuel reduction $\Delta W_1$) and the outboard, wing-mounted engines 203A, 203B to group $G_2$ (fuel increase $\Delta W_2$), since due to the relatively modest ambient RHi, the effect of wingtip vortex interaction will be to eliminate a high proportion of captured contrail ice particles, and the strength of wingtip vortex interaction will be stronger for the outboard, wing-mounted engines 203A, 203B than for the inboard, central engine 202. As with Example 7, adjustments to flight control surfaces (and a corresponding fine adjustment to total thrust) may be required in response to any material change in engine-attributable aircraft pitch-moment arising from implementing $\Delta W_1$ and $\Delta W_2$.

Figure 15:
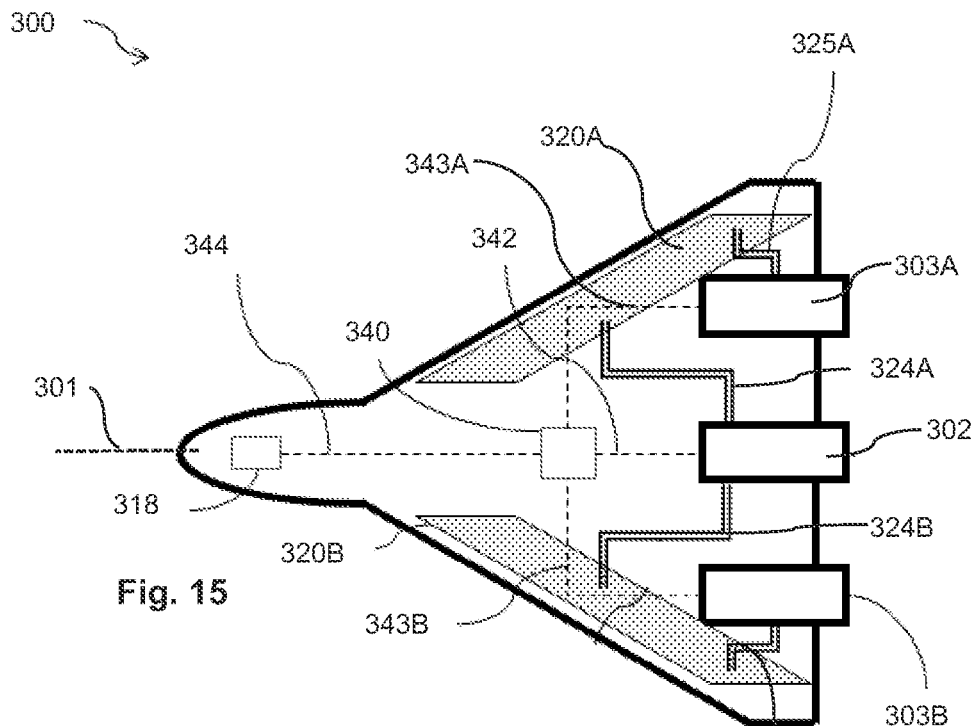
FIGS. 15 to 17 show plan views of a third, fourth and fifth example aircraft respectively.

FIG. 15 shows a plan view of a third example aircraft indicated generally by 300. Parts of the aircraft 300 which correspond to parts of the aircraft 200 of FIG. 12 are labelled with reference numerals which differ by 100 from those labelling the corresponding parts in FIG. 12. The aircraft 300 has a blended wing-body configuration. As such there is no distinct fuselage, wing or empennage. A central or inboard engine 302 is mounted at the longitudinal centreline 301 of the aircraft 300, in-between two outboard engines 303A, 303B. For ease of illustration, the inboard engine 302 is shown drawing fuel from either or both of the main outboard tanks 320A, 320B, although it is to be understood that other fuel-system arrangements are contemplated, including an arrangement where the inboard engine 302 draws fuel from one or more dedicated tanks. Operation of the aircraft 300 to control aircraft-averaged contrail optical depth may be carried out as described above in Examples 7 and 8 in relation to the aircraft 200 of FIG. 12.

Figure 16:
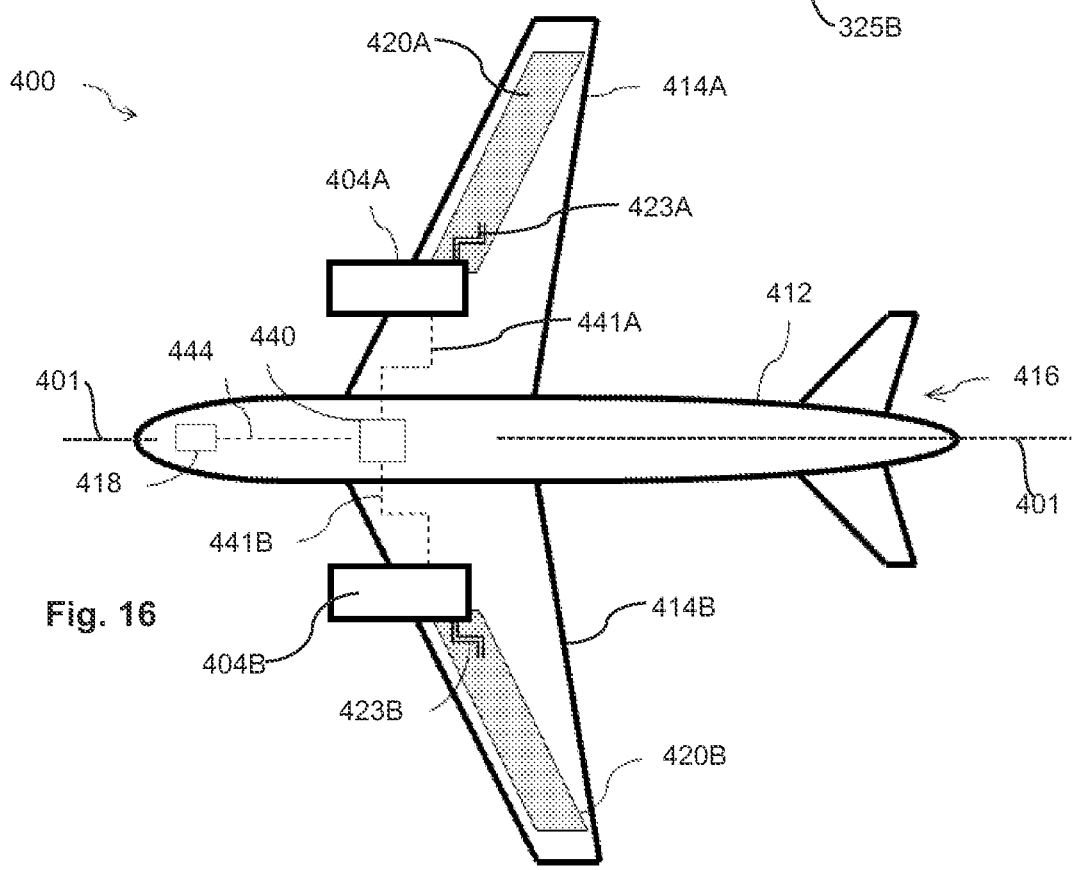

FIG. 16 shows a fourth example aircraft 400 having two wing-mounted lean-burn turbofan engines 404A, 404B. In the case of aircraft 400, there is no distinction between inboard and outboard engines, both engines 404A, 404B being mounted at the same distance along the wing as measured from the nearest wingtip. Parts of the aircraft 400 corresponding to parts of the aircraft 100, 200, 300 of FIGS. 5, 12 and 15 respectively are labelled with reference numerals differing by 300, 200 and 100 respectively from those labelling the corresponding parts in FIGS. 5, 12, and 15.

The aircraft 400 may be operated as described below in Examples 9 and 10 to control the aircraft-averaged optical depth of contrails produced by the aircraft 400.

Example 9

If both engines 404A, 404B initially have their fuel flows slightly above that corresponding to the staging point 50 (e.g. at an end-of-cruise flight segment), ambient RHi is above 100% (modest or high ambient ice supersaturation ISS), and the ambient temperature $T_{amb}$ is greater than the transition temperature $T_{trans}$, then in order to enhance the aircraft"s contrails either engine 404A, 404B is assigned to $G_1$ (fuel flow reduction $\Delta W_1$) and the other is assigned to group $G_2$ (fuel flow increase $\Delta W_2$) since both have the same wing tip vortex interaction. One engine is therefore switched from pilot-plus-mains operation to pilot-only operation and the other remains in pilot-plus-mains-operation. This causes a small amount of engine-attributable aircraft yaw-moment about a yaw axis of the aircraft 400, which can be compensated for by rudder adjustment, and a small amount of additional engine thrust is needed to overcome aircraft rudder drag and maintain the forward velocity and altitude of the aircraft 400. By moving the $G_1$ engine into pilot-only operation, soot (nvPM) emissions and contrail optical depth are increased for the $G_1$ engine. The fuel flow to the engine assigned to $G_2$ moves to the right of staging point 50 in FIG. 2: the soot (nvPM) emissions of this engine increase by a very small amount, adding a small amount to the aircraft-averaged contrail optical depth.

If the initial fuel flow $W_0$ to the engines 404A, 404B is significantly above that corresponding to the staging point 50 in FIG. 2 (for example at the start of a step climb) then it may not be possible to increase the fuel flow to the $G_2$ engine to compensate for the reduction of thrust of the $G_1$ engine without operating the $G_2$ engine in an undesirable or forbidden regime of the type described above with reference to FIG. 7, in which case there may be no adjustment made to the fuel flow rates to the engines 404A, 404B.

Example 10

If both engines 404A, 404B are initially above their staging points 50, RHi is above 100% and the ambient temperature $T_{amb}$ is less than or equal to the transition temperature $T_{trans}$, then in order to reduce the aircraft"s contrails either engine 404A, 404B may be assigned to $G_1$ (fuel flow reduction $\Delta W_1$) and the other assigned to group $G_2$ (fuel flow increase $\Delta W_2$). For the engine assigned to $G_1$, operation is switched from pilot-plus-mains to pilot-only, nvPM emissions increase, e.g. to $n_c$ (or towards $n_c$) as shown in FIG. 11, thus reducing contrail optical depth. The engine assigned to $G_2$ remains in pilot-plus-mains operation; nvPM number and optical depth of the associated contrail change by relatively very small amounts for the engine assigned to $G_2$.

Figure 17:
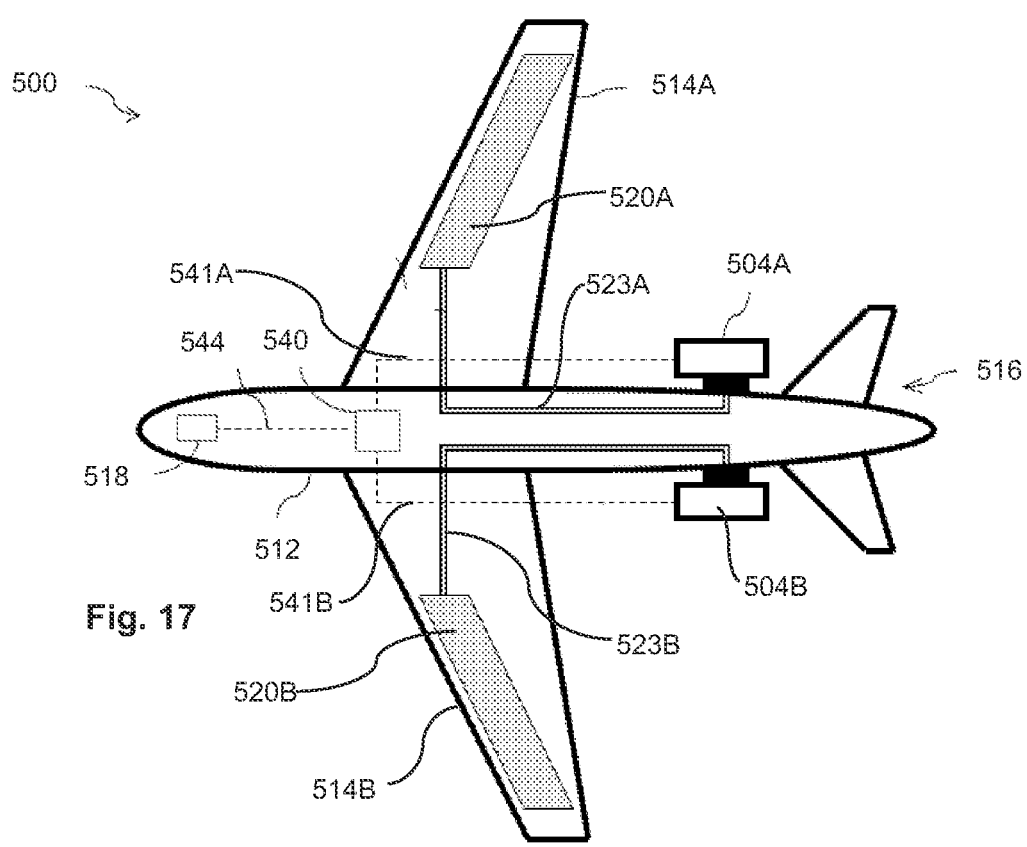

FIG. 17 shows a plan view of a fifth example aircraft 500, the aircraft 500 having two fuselage-mounted lean-burn turbofan engines 504A, 504B. Parts of the aircraft 500 corresponding to parts of the aircraft 400 of FIG. 16 are labelled with reference numerals differing by 100 from those labelling the corresponding parts in FIG. 16. The aircraft 500 may be operated as described above in relation to the aircraft 400 of FIG. 16 in order to control aircraft-averaged optical depth of contrails. It will be appreciated that since the two lean-burn turbofan engines 504A, 504B are mounted close to the longitudinal axis of the aircraft 500, engine-attributable aircraft yaw-moment about a yaw axis of the aircraft 500 caused by operating the two lean-burn turbofan engines 504A, 504B at substantially different fuel flow rates and hence substantially different thrust settings will be smaller, and will thus require less compensatory rudder adjustment which in turn will incur less drag, than would be the case for the same amount of thrust asymmetry on the aircraft 400.

Figure 18:
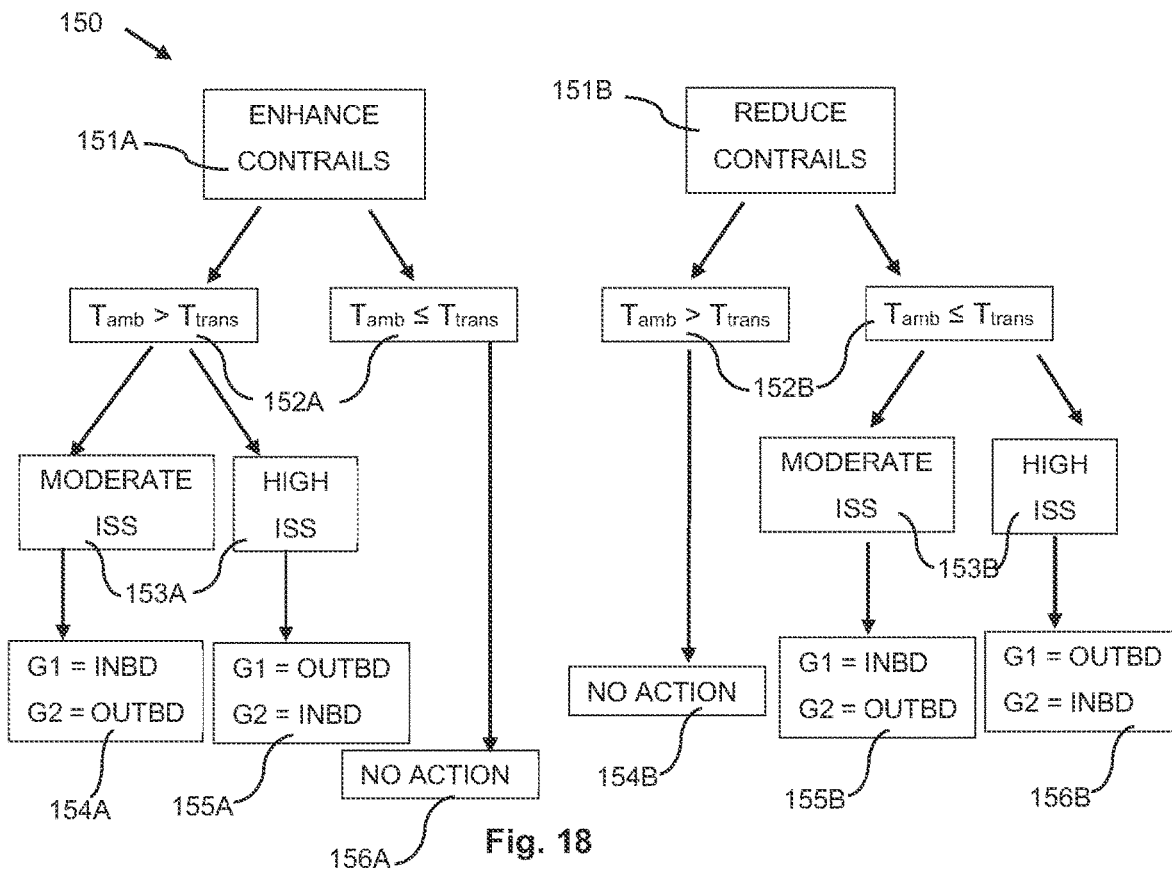
FIG. 18 shows a flow chart illustrating control of the engines of the aircraft of FIG. 5 to enhance or reduce contrails produced by the aircraft.
Figure 19A:
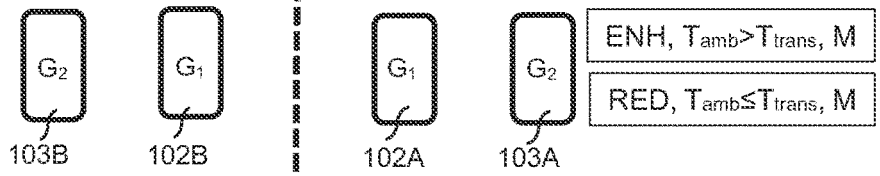
Figure 19B:
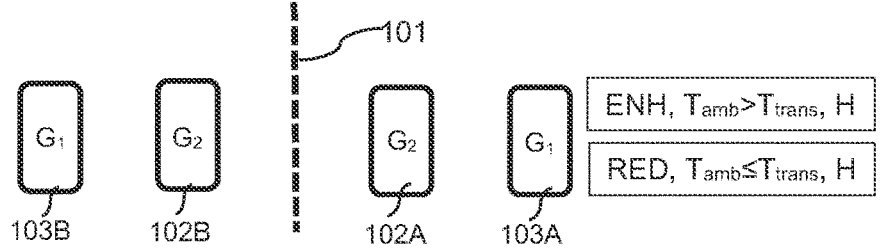

FIG. 18 shows a flow chart 150 illustrating processing steps carried out by the control and decision-making unit 140 of the aircraft 100 of FIG. 5, starting from a condition in which all engines 102A, 102B, 103A, 103B have a common initial fuel flow $W_0$. Initially, a decision is taken as to whether to enhance (151A) or reduce (151B) the aircraft-averaged contrails for the aircraft 100 when the ambient relative humidity over ice (RHi) is greater than or equal to 100%. This may for example depend on whether the aircraft 100 is flying during daytime or night time.

FIGS. 19A-19D show four possible engine groupings (one of which may be implemented after the processing steps of FIG. 18 are carried out if any change is implemented to fuel flows to individual engines) into a first group $G_1$ in which the fuel flow to each engine is reduced from its initial value and a second group $G_2$ in which the fuel flow to each engine is adjusted such that the total fuel flow to engines of the second group is increased, all engines of the second group remaining in pilot-plus-mains mode. In FIGS. 19A-19D (also FIGS. 21A-C and 23), ENH and RED indicate an objective to enhance or reduce aircraft-averaged contrails respectively, and M and H indicate modest (e.g. ambient RHi between 100% and 110% or 120%) or high (e.g. ambient RHi greater than 120% or 130%) ambient ice supersaturation respectively. "RUDDER" indicates that one or more flight control surfaces of the aircraft 100 must be adjusted in order to compensate for an engine-attributable aircraft yaw-moment and/or an engine-attributable aircraft pitch-moment when fuel flows to the engines 102A, 102B, 103A, 103B are changed in accordance with the invention.

Referring to FIG. 18, if the objective is to enhance (151A) contrails of the aircraft 100, the unit 140 determines whether the ambient temperature is greater than, or less than or equal to, the transition temperature (152A) based on input from the temperature sensor. If the ambient temperature $T_{amb}$ is greater than the transition temperature $T_{trans}$, the unit 140 determines whether the ambient ice supersaturation (ISS) level is moderate (e.g. ambient RHi between 100% and 110%) or high (e.g. ambient RHi around 130%) based on input from the humidity sensor. If the ice supersaturation level is moderate, the inboard engines 102A, 102B are assigned to the first engine group $G_1$ and the fuel flow to these engines is reduced; the outboard engines 103A, 103B are assigned to the second group $G_2$ and the fuel flows to these engines are increased (154A and see configuration of FIG. 19A). If the ambient ice supersaturation level is high then the outboard engines 103A, 103B are assigned to the first group $G_1$ (fuel flow reduction) and the inboard engines 102A, 102B are assigned to the second group $G_2$ (fuel flow increase) (155A and configuration of FIG. 19B).

If all of the $G_2$ engines cannot for operational reasons have their fuel flows increased far enough to compensate for the fuel flow reductions applied to the $G_1$ engines, as in Example 3 above, one engine is re-assigned from $G_1$ to $G_2$ and flight control surfaces of the aircraft 100 used to compensate for engine-attributable aircraft yaw-moment about a yaw axis of the aircraft 100 and/or engine-attributable aircraft pitch-moment about a pitch axis of the aircraft 100. It will be appreciated that further adjustments of the thrust distribution within $G_2$ may be implemented so as to mimimise the extent of engine attributable aircraft yaw-moment and or engine-attributable aircraft pitch-moment and thus to minimise the required flight control surfaces drag. The configuration of FIG. 19C (or its mirror-image about the axis 101) is used instead of the configuration of FIG. 19A; the configuration of FIG. 19D (or its mirror-image about the axis 101) is used instead of the configuration of FIG. 19B. The total overall thrust produced by the engines 102A, 102B, 103A, 103B is increased to compensate for flight control surfaces drag and maintain the forward velocity and altitude of the aircraft 100. It will be appreciated that the increase in total thrust required to compensate for increased flight control surfaces drag will be implemented in such a way that the or each engine of the first group of engines remains in a pilot-only mode of operation, for example by restricting such compensatory adjustments to engines of the second group of engines. It will further be appreciated that such compensatory adjustments need not be shared equally between engines of the second group of engines.

If the ambient temperature $T_{amb}$ is less than or equal to the transition temperature $T_{trans}$, one option is to take no action (156A) since with all engines operating in pilot-plus-mains mode, nvPM (soot) emissions cannot be reduced further in order to increase contrail optical depth. However, referring to FIGS. 4 and 11, it may be possible to increase the optical depth of a contrail by increasing nvPM number or soot output of an engine, by switching to pilot-only operation, so that the engine operates in the soot-rich portion of FIGS. 4 and 11 and produces a contrail with increased optical depth.

If the objective is to reduce (151B) aircraft-averaged contrail optical depth, unit 140 determines ambient temperature (152B) and ambient ice supersaturation (153B) regimes. If the ambient temperature $T_{amb}$ is greater than the transition temperature $T_{trans}$, no action is taken (154B) since the soot produced by the engines 102A, 102B, 103A, 103B is already minimised as all engines are in pilot-plus-mains mode. If the ambient temperature $T_{amb}$ is less than or equal to the transition temperature $T_{trans}$, then the unit 140 determines whether the ambient ice supersaturation level is moderate (e.g. ambient RHi is between 100% and 110%) or high (e.g. ambient RHi around 130% or higher). For moderate ice supersaturation, the inboard engines 102A, 102B are assigned to engine group $G_1$ (fuel reduction) and the outboard engines to group $G_2$ (fuel increase) (155B and FIG. 19A). For high ambient ice supersaturation, the outboard engines 103A, 103B are assigned to group $G_1$ (fuel reduction) and the inboard engines 102A, 102B to group $G_2$ (fuel increase) (156B and FIG. 19B).

If the $G_2$ engines cannot for operational reasons have their fuel flows increased far enough to compensate for the fuel flow reductions applied to the $G_1$ engines, one engine may be re-assigned from $G_1$ to $G_2$ and flight control surfaces of the aircraft 100 used to compensate for engine-attributable aircraft yaw-moment about a yaw axis of the aircraft 100 and/or engine-attributable aircraft pitch-moment about a pitch axis of the aircraft 100 (FIGS. 19C, 19D). It will be appreciated that further adjustments of the thrust distribution within $G_2$ may be implemented so as to mimimise the extent of engine attributable aircraft yaw-moment and or engine-attributable aircraft pitch-moment and thus to minimise the required flight control surfaces drag. The total overall thrust produced by the engines 102A, 102B, 103A, 103B is increased to compensate for flight control surfaces drag and maintain the forward velocity and altitude of the aircraft 100. It will be appreciated that the increase in total thrust required to compensate for increased flight control surfaces drag will be implemented in such a way that the or each engine of the first group of engines remains in a pilot-only mode of operation, for example by restricting such compensatory adjustments to engines of the second group of engines. It will further be appreciated that such compensatory adjustments need not be shared equally between engines of the second group of engines.

A threshold may be applied to the extent to which the aircraft-averaged contrail optical depth or climate impact for the aircraft 100 is changed by configurations 154A, 155A, 155B, 156B compared to those for the aircraft 100 in its initial operating condition. If the extent of the changes in contrail optical depth or climate impact of a given engine operating configuration is below the threshold, the control and decision-making unit 140 may not implement any changes to the fuel flows of the engines 102A, 102B, 103A, 103B and the fuel flows will then remain at their initial values.

In cases where adjustment of fuel flows to individual engines results in engine-attributable aircraft yaw-moment about a yaw axis of the aircraft 100 and/or engine-attributable aircraft pitch-moment about a pitch axis of the aircraft 100, one of three modes of operation ((a)-(c) below) may be employed to control flight control surfaces of the aircraft 100 to compensate for the engine attributable aircraft yaw-moment and/or engine-attributable aircraft pitch-moment:

(a) Interaction with manual pilot: Once the unit 140 has completed its calculations and determined that a change of thrust distribution is desired, the pilot is notified via the data link 144, advising of the nature of the proposed change in the thrust distribution and/or the expected change in the engine-attributable aircraft yaw-moment and/or engine-attributable aircraft pitch-moment. The unit 140 then waits for permission to be granted by the pilot, who adjusts the appropriate flight control surfaces and/or trims in response to the thrust-distribution changes. In cases where the expected change in engine attributable aircraft yaw-moment and/or engine-attributable aircraft pitch-moment falls below some predetermined threshold, this step is not carried out.

(b) Interaction with autopilot: In cases where the aircraft is running on autopilot, the autopilot adjusts the flight control surfaces (and/or trims) automatically in response to changes in the thrust distribution, so as to maintain the aircraft"s orientation. Optionally, autopilot permission could be requested before implementing a thrust-distribution change. Optionally, operation of the present invention could be restricted to periods when the aircraft is on autopilot.

(c) Fully autonomous: the control and decision-making unit 140 may be empowered to make adjustments to the flight control surfaces (and/or trims) as required to maintain aircraft orientation.

For RHi values less than 100%, no action is taken since contrails produced by the engines 102A, 102B, 103A, 103B will not persist and thus any changes to their properties would have only a minimal climate impact.

Figure 21A:
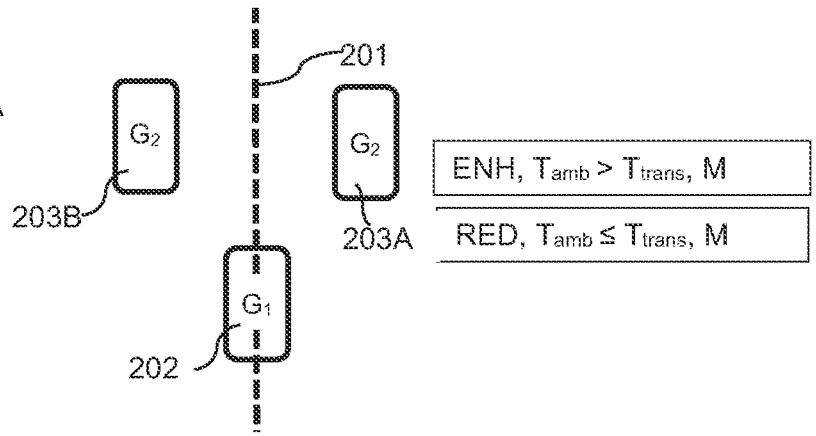
FIGS. 21A-C show three groupings of the engines of the FIG. 12 aircraft into first and second groups for achieving enhancement or reduction of contrails produced by the aircraft.
Figure 21B:
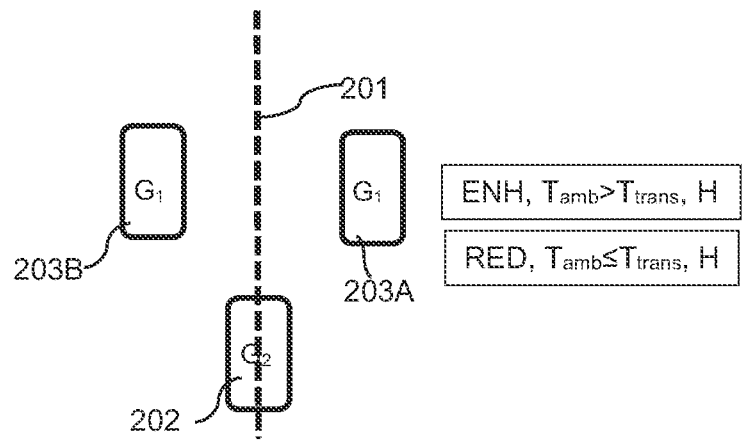
Figure 21C:
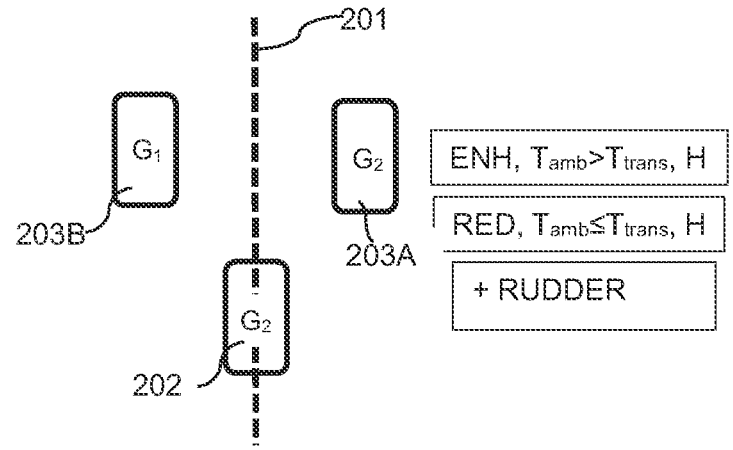

FIG. 20 shows a flow chart 250 representing processing carried out by units 240, 340 of the aircraft 200, 300 of FIGS. 12 and 15 respectively. Since the aircraft 200, 300 each have a single inboard (central) engine 202, 302 and two outboard engines 203A, 203B, 303A, 303B, the flow chart 250 has a form similar to that of the flowchart 150 of FIG. 18; steps in the flow chart 250 having corresponding steps in the chart 150 of FIG. 18 are labelled with reference numerals differing by 100 from those labelling the corresponding steps in FIG. 18. FIGS. 21A and 21B show engine groupings corresponding to steps 254A, 255B and 255A, 256B respectively, one of which may be implemented if a change is made to individual engine fuel flows following execution of the process 250. The configuration of FIG. 21C (or its mirror-image about axis 201) is used instead of the configuration of FIG. 21B in a case where fuel flow to the single, central, inboard engine 202, 302 cannot be increased sufficiently to compensate for fuel reduction to the two outboard engines 203A, 203B, 303A, 303B due to operating considerations for that single, central inboard engine.

As described above in relation to operation of the aircraft 100, adjustment of flight control surfaces in cases where fuel flow control results in engine-attributable aircraft yaw-moment and/or engine-attributable aircraft pitch-moment may be effected by interaction of the control and decision-making unit 240, 340 with a manual or autopilot, or fully autonomously. Thresholding in terms of the change in contrail optical depth or actual climate impact may be applied to a given engine configuration 254A, 255A, 255B, 256B so that a given configuration is only put into effect if the change in optical depth or climate impact, relative to that for an initial condition in which all engines have a common fuel flow $W_0$, exceeds a pre-determined threshold.

Figure 22:
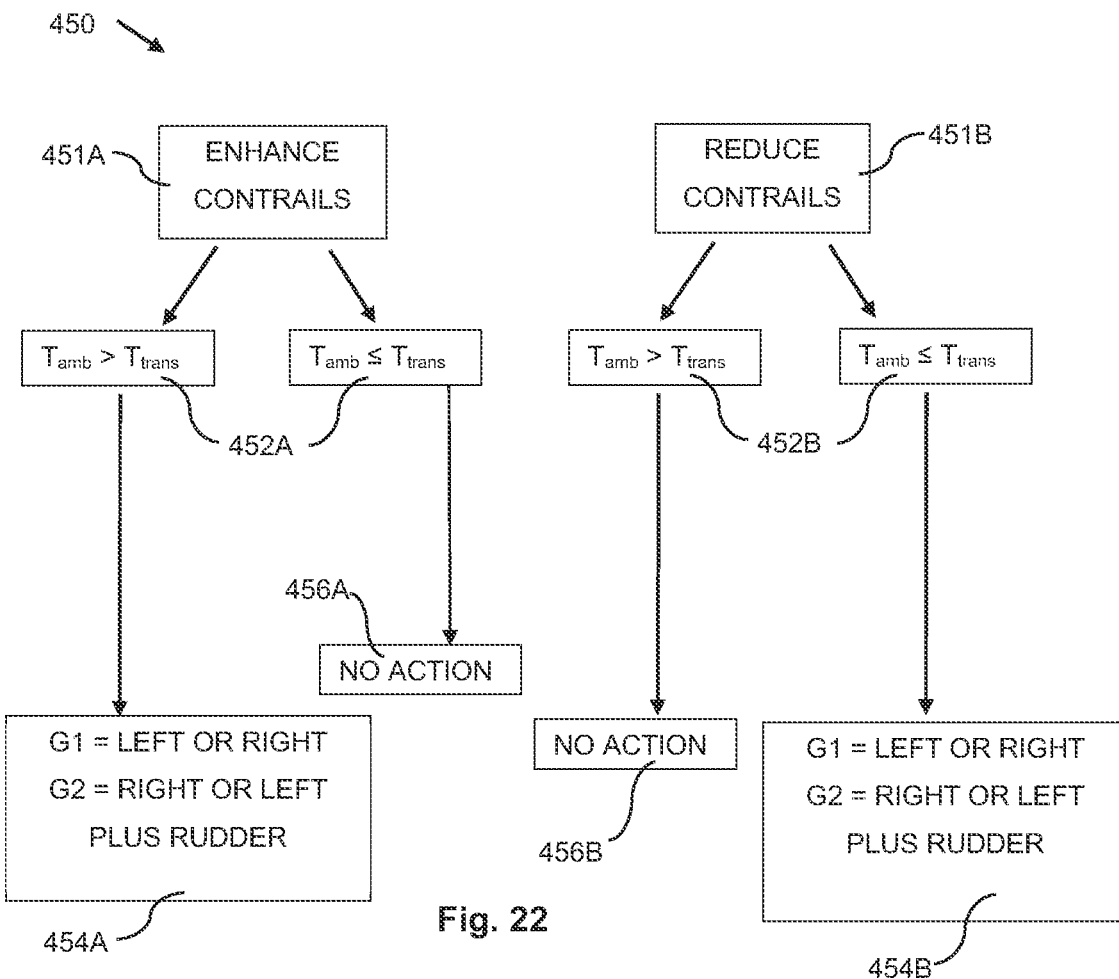
FIG. 22 shows a flow chart illustrating control of the engines of the aircraft of FIG. 16 to enhance or reduce contrails produced by the aircraft.

FIG. 22 is a flow chart 450 showing processing steps carried out by units 440, 540 of the aircraft 400, 500 of FIGS. 16 and 17 respectively. Initially a decision may be taken as to whether to enhance (451A) or reduce (451B) contrails produced by the aircraft 400, 500. If the objective is to increase aircraft-averaged contrail optical depth, the units 440, 540 determine whether the ambient air temperature $T_{amb}$ is greater than, or less than or equal to, the transition temperature $T_{trans}$ (452A). If $T_{amb} > T_{trans}$ either an engine 404A, 504A on a first side of the aircraft 400, 500 or an engine 404B, 504B on a second side of the aircraft 400, 500 may be assigned to $G_1$ (fuel increase) and the other engine assigned to $G_2$ (fuel decrease) (454A). The increase in soot (non-volatile particulate matter) from the $G_1$ engine increases the optical depth of the contrail produced by that engine. Due to engine-attributable aircraft yaw-moment, a rudder of the aircraft is deployed appropriately, and the total thrust increased to compensate for rudder drag. If $T_{amb} \leq T_{trans}$ no action may be taken (456A)—soot (nvPM) produced by an engine cannot be reduced to increase contrail optical depth as soot is already at a minimum in pilot-plus-mains operation. However as noted above it may be possible to increase contrail optical depth by increasing the nvPM number of an engine so that it moves into the soot-rich portions of FIGS. 4 and 11.

If the objective is to reduce (451B) aircraft-average contrail optical depth, no action is taken (456B) where $T_{amb} > T_{trans}$ (452B) since soot (nvPM) output cannot be reduced beyond that achieved in pilot-plus-mains operation. Where $T_{amb} \leq T_{trans}$ (452B) an increase in soot (nvPM) from an engine reduces contrail optical depth (454B); one engine is therefore assigned to $G_1$ (fuel increase) and one to $G_2$ (fuel decrease).

Figure 23:
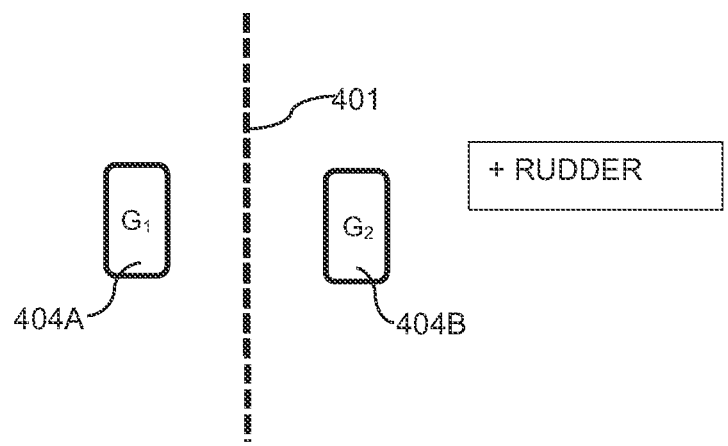
FIG. 23 shows one possible grouping of the engines of the FIG. 16 aircraft into first and second groups for achieving enhancement or reduction of contrails.

FIG. 23 shows one possible engine grouping for the aircraft 400 of FIG. 16 which may be applied at steps 454A and 454B. A first engine 404A on a first lateral side of the aircraft 400 is assigned to the first group (fuel reduction) and the other engine 404B is assigned to the second group (fuel increase).

The foregoing description and FIGS. 5 to 23 show how aircraft-averaged contrail optical depth may be controlled based on the following considerations:

whether the object is to enhance or reduce aircraft-average contrail optical depth;

the ambient relative humidity over ice (RHi), i.e. whether the ambient ice supersaturation (ISS) level is moderate or high;

whether the ambient temperature is greater than, or less than or equal to, the transition temperature.

In general, the adjustment of fuel flows to individual lean-burn engines of an aircraft also depends on aircraft configuration (i.e. whether an aircraft has 2, 3 or 4 engines), the extent of wing tip vortex interaction and the extent to which the initial or default fuel flow $W_0$ to each engine exceeds that corresponding to the staging point 50 of the lean-burn turbofan engines.

General Decision-Making and Control Strategy.

The following sets out a general decision-making and control strategy for adjusting the fuel flows to individual engines of an aircraft, which strategy incorporates the specific cases described in examples 1 to 10 and FIGS. 18, 20 and 22 above and which may be implemented by the control and decision-making units 140, 240, 340, 440, 540 of the aircraft 100, 200, 300, 400, 500 respectively.

In many cases, the total net thrust provided to the aircraft is unchanged by the present invention. In some cases, a small increase in net thrust may be necessary to compensate for additional flight control surfaces drag associated with cancellation of engine-attributable aircraft yaw-moment and/or engine-attributable aircraft pitch-moment. The intended outcome in all cases is that the aircraft"s speed and altitude should not be changed by the method of the present invention.

In the following description it is assumed that net thrust within an engine group is equally distributed between engines of that group. It will be appreciated that modifications to the following could be contemplated to cover situations in which the net thrust distribution within either engine group or both engine groups is unequal. In particular, it will be appreciated that within the second engine group, there may in some cases be considerable flexibility in choosing a particular thrust distribution so as to minimise engine-attributable aircraft yaw-moment and/or engine-attributable aircraft pitch-moment, subject to the constraints that 1) no engine (of either engine group) is moved into a forbidden (or at least undesirable) range of fuel flow rate W such as that corresponding to the hatched area 52 of FIG. 7; that 2) no engine of the second engine group is moved from pilot-plus-mains mode to pilot-only mode; and that 3) aircraft speed and altitude is not changed (taking account of any necessary flight-control surfaces adjustments and the associated drag). It will be further appreciated that such adjustments within the second engine group will have a minimal impact upon soot emissions from the second engine group as a whole since, within the pilot-plus-mains mode of operation, nvPM number changes only very slowly with respect to fuel flow rate. Within the first engine group it is most likely that each engine would be moved to substantially the same fuel flow rate in order to achieve a desired nvPM number.

Also, it is assumed that all engines assigned to an engine group are operational. In cases where not all engines on the aircraft are operational, then only operational engines would be assigned to an engine group. If non-operation of one or more engine is due to a failure or error condition, rather than due to a design feature of the propulsion system, then optionally the present invention could be disabled or suppressed until the failure or error condition is resolved. It will be appreciated that modifications to the following could be contemplated to cover situations in which not all engines are operational and the selected assignment of engines to engine groups would therefore be altered accordingly. Regardless of whether there is a failure condition or not, if the number of operational engines is less than two, the present invention should be disabled or suppressed.

Broad Outline of Decision-Making Process.

Figure 24:
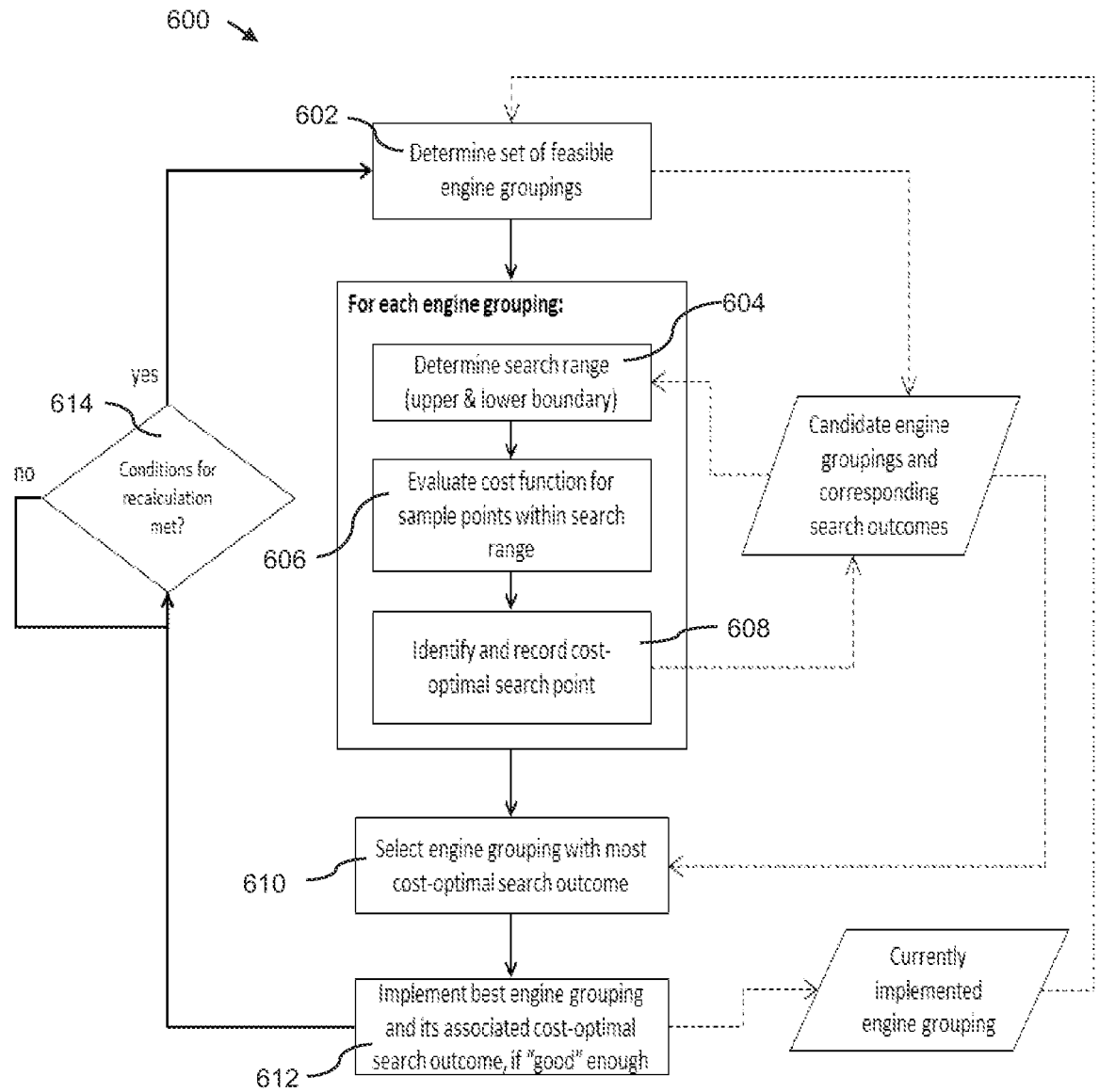
FIG. 24 shows a scheme for evaluating groupings of engines of an aircraft into first and second groups with respect to their climate impact.
Figure 25:
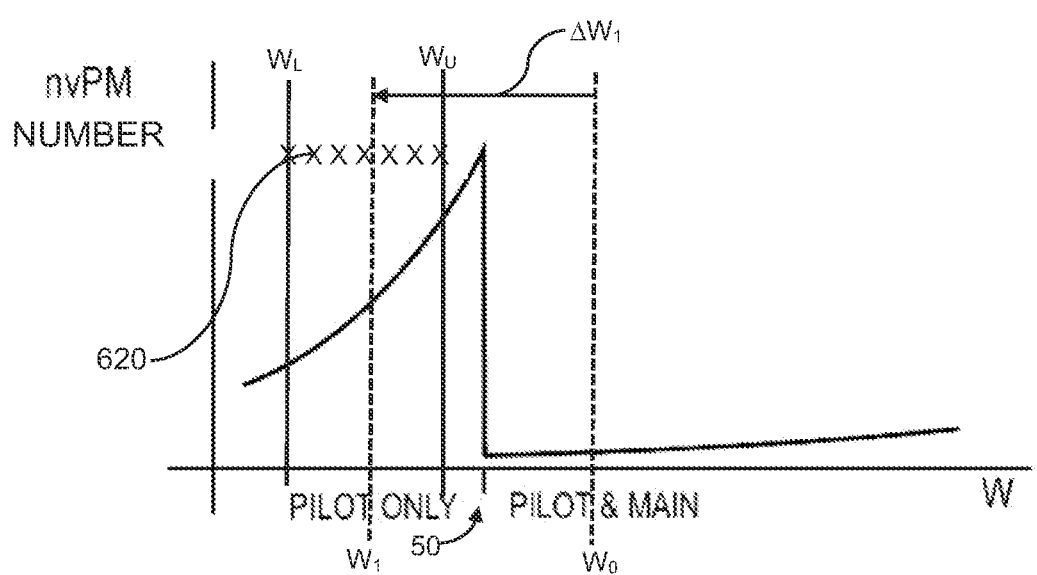
FIG. 25 illustrates evaluation of a particular grouping for various values of fuel flow to each of a first group of engines, the values lying in a range including lower and upper fuel flow limits.

Referring to FIG. 24 and FIG. 25, an overall strategy (600) may be defined as follows:

Taking into account the aircraft configuration and the operational status of each engine (i.e. operating or not), identify (602) a collection of one or more engine groupings to be evaluated. An engine grouping is one way of assigning each operational engine to either the first engine group $G_1$ or the second engine group $G_2$.

For each identified engine grouping:
Determine (604) a single-parameter search range characterised by an upper boundary $W_U$ and a lower boundary $W_L$ for engine fuel-flow rate pertaining to engines of the first engine group $G_1$ within the identified engine grouping.

Within the determined search range, sample a number of search points such as 620. For each search point, evaluate (606) a cost function. Options for sampling search points might include one or more of:
Sample the upper boundary, the lower boundary and one or more equally spaced intermediate points.
Use an optimisation algorithm to find the lowest-cost search point.
Identify the most advantageous search point, i.e. that with the lowest associated cost function. Keep a record of the lowest-cost search point and its associated cost (608).

From the set of engine groupings, select (610) the engine grouping corresponding to the lowest-cost search point.

In cases where the selected engine grouping and its associated lowest-cost parameter offers a benefit that exceeds a pre-determined threshold relative to prior-art operation, implement (612) the selected engine grouping and its associated lowest-cost parameter value i.e. choose the most advantageous combination identified in the search. If the benefit does not exceed a pre-determined threshold relative to prior-art operation, operate as per the prior art.

Set a timer for repeating the calculations at some future moment. Alternatively, enter a test loop which repeatedly tests against some condition which, when satisfied, will trigger the calculations above to be performed again (614). A timer may be implemented as a test loop in which the test condition corresponds to a particular time.

Assigning Engines to Engine Groups $G_1$ and $G_2$

The assignment of engines to engine groups will be influenced by some or all of the factors listed below. In some cases, more than one assignment will need to be evaluated before a final choice is made.

(i) The aircraft configuration—number of engines and their positions on the airframe;

(ii) The extent to which the default fuel flow rate for each engine lies above the staging point 50 of the engines;

(iii) The effect of wingtip vortex interaction, in particular whether it will enhance or reduce the post-vortex contrail;

(iv) The intended outcome, i.e. contrail reduction or contrail enhancement.

For 2-engine aircraft configurations (e.g. the aircraft 400, 500 of FIGS. 16 and 17 respectively), the wingtip-vortex interaction does not influence the assignment of engines to groups, since all engines are identical as far as wingtip vortex interaction is concerned. From the perspective of contrail property modification therefore, either engine can thus be assigned to the first engine group $G_1$ and therefore the other engine is assigned to the second engine group $G_2$.

However, there may be practical reasons to prefer one engine grouping over the other. If an engine grouping is not currently implemented, in other words if the aircraft is currently operating as per the prior art, then either engine grouping could be selected at random for evaluation and potential implementation, or alternatively the opposite engine grouping to that which was implemented during the previous implementation instance could be selected. However if an engine grouping is currently implemented, then the same engine grouping should be selected for re-evaluation, in order to avoid repeated swapping between engine groupings during a single period of contrail property modification.

For 3-engine aircraft configurations (e.g. the aircraft 200, 300 of FIGS. 12 and 15 respectively), the natural distinction is between the single, central, inboard engine and the two outboard engines, thus there are two possible assignment options. However, in some cases (as described previously) it may be necessary to assign one outboard engine to the first engine group $G_1$, and the central, inboard engine plus the other outboard engine to the second engine group $G_2$.

For the aircraft 100 of FIG. 5 (4 engines), in many cases the assignment of engines to engine groups will be done on the basis of inboard vs outboard engines, resulting in two groups of equal cardinality. However, in some cases (as described previously) it may be necessary to assign one engine to the first engine group $G_1$ and three engines to the second engine group $G_2$. Minimisation of engine-attributable aircraft yaw-moment would motivate assignment of one of the inboard engines (choosing between left or right randomly, or with reference to the previous implementation instance, or with reference to a currently-implemented engine grouping) to the first engine group $G_1$. However, in some cases there may be an overall benefit (according to the method set out below) in assigning one of the outboard engines to the first engine group $G_1$.

In the general case, all possible distinct engine groupings available to an aircraft can be evaluated and the most advantageous grouping selected. Several distinct categories of engine grouping can be identified and defined as follows:

An "inboard" engine grouping is one in which the first engine group comprises at least one inboard engine and no outboard engines, while the second engine group comprises at least one outboard engine.

Conversely, an "outboard" engine grouping is one in which the first engine group comprises at least one outboard engine and no inboard engines, while the second engine group comprises at least one inboard engine.

An "asymmetric" engine grouping is an engine grouping in which the centre of thrust of at least one engine group does not lie substantially on the aircraft"s longitudinal axis when the engines within that group each provide the same net thrust as each other.

A "symmetric" engine grouping is one in which the centre of thrust of the first engine group lies substantially on the aircraft"s longitudinal axis when all engines of the first engine group are providing the same net thrust as each other, and in which the centre of thrust of the second engine group also lies substantially on the aircraft"s longitudinal axis when all engines of the second engine group are providing the same net thrust as each other.

For aircraft in which all engines are operational, a complete list of engine groupings is given in Tables 1 to 3 below. The notation used in Tables 1-3 below for an engine grouping is <(A);(B)> where A is a comma-separated list of engines assigned to the first engine group $G_1$ and B is a comma-separated list of engines assigned to the second engine group $G_2$. Individual engines are identified by numbers running from 1 (port-most) to n (starboard-most).

For asymmetric engine groupings, the two options presented in the final two columns of the tables are mirror images of each other, and hence are functionally equivalent. For symmetric engine groupings, only one option is available for each row of the relevant table.

TABLE 1

POSSIBLE ENGINE GROUPINGS FOR AIRCRAFT WITH 2 ENGINES

| Symmetry | Type | Cardinality of First Engine Group | Option1 | Option2 |
|---|---|---|---|---|
| Asymmetric | — | 1 | <(1); (2)> | <(2); (1)> |

TABLE 2

POSSIBLE ENGINE GROUPINGS FOR AIRCRAFT WITH 3 ENGINES

| Symmetry | Type | Cardinality of First Engine Group | Option1 | Option2 |
|---|---|---|---|---|
| Symmetric | Outboard | 2 | <(1, 3); (2)> | N/A |
| Symmetric | Inboard | 1 | <(2); (1, 3)> | N/A |
| Asymmetric | Outboard | 1 | <(1); (2, 3)> | <(3); (2, 1)> |
| Asymmetric | — | 2 | <(1, 2); (3)> | <(3, 2); (1)> |

TABLE 3

POSSIBLE ENGINE GROUPINGS FOR AIRCRAFT WITH 4 ENGINES

| Symmetry | Type | Cardinality of First Engine Group | Option1 | Option2 |
|---|---|---|---|---|
| Symmetric | Outboard | 2 | <(1, 4); (2, 3)> | N/A |
| Symmetric | Inboard | 2 | <(2, 3); (1, 4)> | N/A |
| Asymmetric | Outboard | 1 | <(1); (2, 3, 4)> | <(4); (3, 2, 1)> |

TABLE 3-continued

POSSIBLE ENGINE GROUPINGS FOR AIRCRAFT WITH 4 ENGINES

| Symmetry | Type | Cardinality of First Engine Group | Option1 | Option2 |
|---|---|---|---|---|
| Asymmetric | Inboard | 1 | <(2); (1, 3, 4)> | <(3); (4, 2, 1)> |
| Asymmetric | — | 2 | <(1, 2); (3, 4)> | <(4, 3); (2, 1)> |
| Asymmetric | — | 2 | <(1, 3); (2, 4)> | <(4, 2); (3, 1)> |
| Asymmetric | — | 3 | <(1, 2, 3); (4)> | <(4, 3, 2); (1)> |
| Asymmetric | — | 3 | <(1, 2, 4); (3)> | <(4, 3, 1); (2)> |

In the general case, one option from each row of the relevant table should be evaluated. For asymmetric groupings, where there are two options in the same row of the table, either option can be picked at random, unless one is already being implemented, in which case to avoid rapid switching between options that same option should be selected again.

Parameterisation.

Referring again to FIG. 25, for a given grouping of engines into engine groups $G_1$ and $G_2$, the extent of deployment/actuation of the present invention is defined by a single parameter, namely the change in fuel flow rate to each engine within the first engine group. Let this parameter be $\Delta W_1$.

Since (by definition) the first engine group comprises engines whose fuel-flow rates are reduced (relative to prior art fuel-flow rates) by the present invention, then $\Delta W_1$ is non-positive.

Clearly, if $\Delta W_1$ takes a value of zero, then the present invention has no effect and all engines operate as per the prior art at their nominal or default fuel flow rate $W_0$.

Before attempting to determine an optimal value of $\Delta W_1$ (corresponding to an optimal fuel flow $W_1 = W_0 + \Delta W_1$), we must first identify an upper boundary $W_U$ and lower boundary $W_L$ of the range of potential fuel flow values we might wish to evaluate. The fuel flow upper boundary $W_U$ corresponds to the least negative value of $\Delta W_1$ that we might wish to evaluate, and the fuel flow lower boundary $W_L$ corresponds to the most negative value of $\Delta W_1$ that we might wish to evaluate.

Noting that a primary purpose of the present invention is to move engines of the first engine group from pilot-plus-mains operation to pilot-only operation, it follows that $\Delta W_1$ must be sufficiently negative to achieve that purpose. Thus the upper boundary for $\Delta W_1$ is obtained by subtracting the initial or default fuel-flow $W_0$ at a given flight condition from the fuel-flow, for the same flight condition, corresponding to fuel staging point 50 in FIG. 25. The upper boundary $W_U$ is the fuel flow rate corresponding to the upper boundary for $\Delta_1$.

Optionally, the upper boundary $W_U$ (and the corresponding upper boundary for $\Delta W_1$) may be adjusted such that it corresponds to a fuel flow slightly below point 50, perhaps by a small pre-determined percentage. This would ensure that the upper boundary $W_U$ (and the corresponding upper boundary for $\Delta W_1$) corresponds to a fuel flow lying firmly within the pilot-only region of operation rather than sitting right on the boundary (fuel staging point 50) between pilot-only operation and pilot-plus-mains operation, and is intended to avoid instability or cycling between those two modes if implemented in practice.

The lower boundary $W_L$ may be defined in one of several different ways:

The lower boundary $W_L$ (which is a fuel flow rate corresponding to a lower boundary for $\Delta W_1$) may be a predetermined fixed negative value, or may correspond to a predetermined negative percentage of the nominal fuel flow rate.

The lower boundary for $\Delta W_1$ may take a different predetermined negative value, or a different predetermined negative percentage of the nominal fuel flow rate, for different nominal (prior art) fuel flow rates.

The lower boundary $W_L$ and the corresponding lower boundary for $\Delta W_1$ may be selected in order to avoid compromising engine operability of the or each engine within the first engine group.

Additionally or alternatively the lower boundary $W_L$ and the corresponding lower boundary for $\Delta W_1$ may be selected in dependence upon the cardinality of the first engine group, the cardinality of the second engine group, and the maximum per-engine fuel flow rate increase that can be tolerated on the or each engine of the second engine group, for example to stay within temperature, e.g. T40, limits on those engines, in other words to avoid a forbidden (or at least undesirable) region of fuel flow rate.

Additionally or alternatively, the lower boundary $W_L$ and the corresponding lower boundary for $\Delta W_1$ may be modified or switched to a different predetermined value or a different set of predetermined values, in response to a sensed condition, for example detection of abnormal engine operation.

Figure 26:
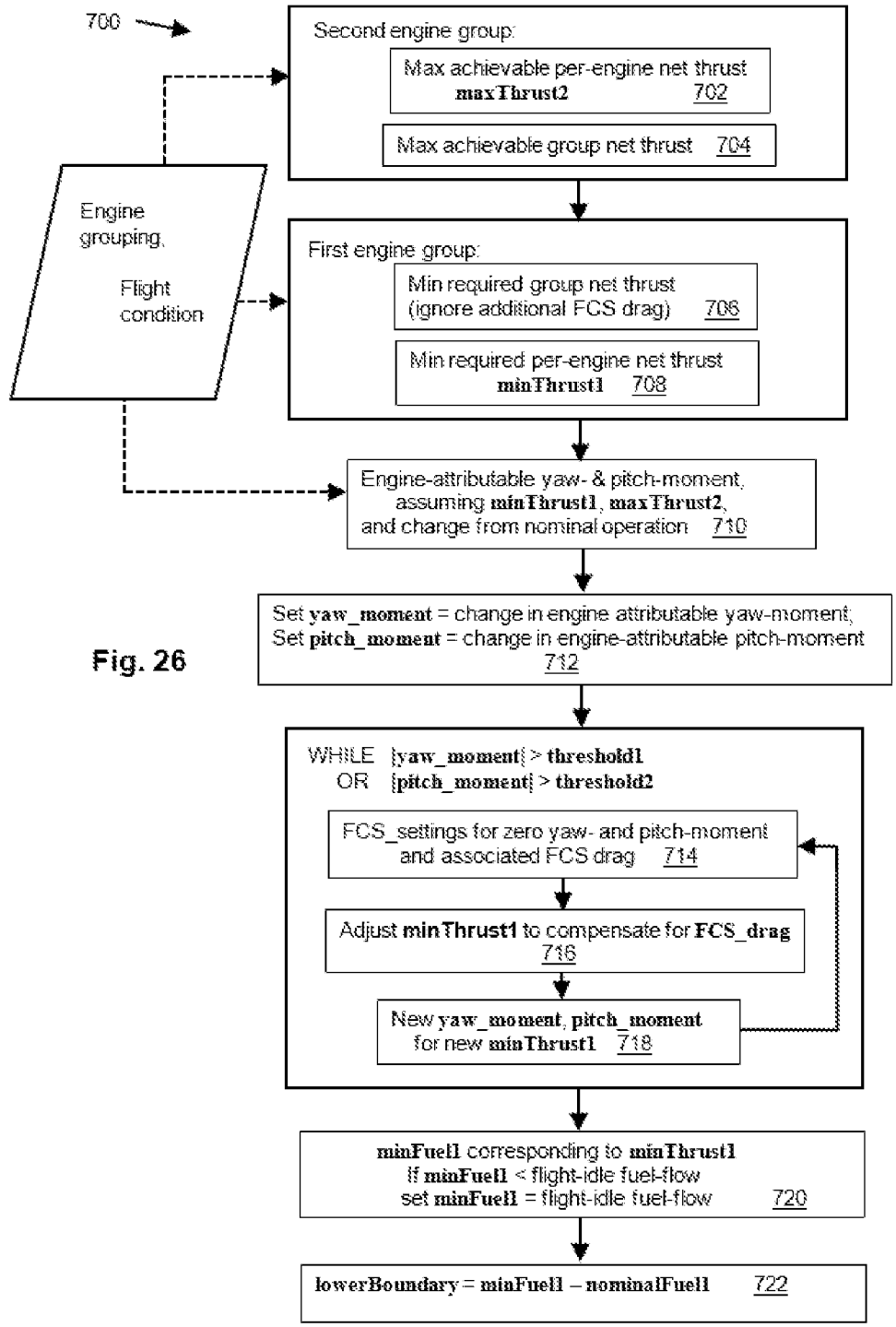
FIG. 26 illustrates a method of determining a lower limit of fuel flow for an engine grouping.

Referring to FIG. 26, a specific method to identify the most negative allowable lower boundary for $\Delta W_1$ and the corresponding lower boundary $W_L$ for a given grouping of engines into engine groups and for a given flight condition (characterised by for example one or more of an altitude, a climb rate, an aircraft Mach number, ambient temperature, ambient pressure and ambient relative humidity) is as follows:

Let the cardinality of the first engine group and of the second engine group be respectively cardinality1 and cardinality2.

Let nominalFCSDrag be the drag of the flight control surfaces (FCS) when in a nominal (initial) position.

Let nominalFuel1 be the nominal (initial) fuel flow for the or each engine of the first engine group.

Using methods familiar to the skilled person, calculate (702) the maximum net thrust that the or each engine of the second engine group can provide at the given flight condition, taking account of constraints such as limits on spool speeds, and limits on engine operating temperatures. Let this thrust be called maxThrust2.

Multiply maxThrust2 by cardinality2. Let the result be maxThrust2(Group) (704).

Calculate the minimum thrust that the first engine group must provide, taking into account the aircraft net thrust requirement (assuming that nominal FCSDrag still applies) and the value of maxThrust2(Group) (706).

Divide by cardinality1 to obtain a baseline estimate of the minimum allowable thrust for the or each engine of the first engine group. Call this minThrust1NominalFCS (708).

Set minThrust1 to the same value as minThrust1NominalFCS.

Calculate the engine-attributable aircraft yaw-moment and engine-attributable aircraft pitch-moment (710) using well-known methods, taking account of the distance of each engine from respectively the yaw axis and the pitch axis of the aircraft. The calculation should be performed 1) for nominal (initial) fuel flows and 2) for fuel flows corresponding to minThrust1 (for the or each engine of the first engine group) and maxThrust2 (for the or each engine of the second engine group).

Calculate the nominal (initial) aircraft yaw-moment and nominal (initial) aircraft pitch-moment attributable to the flight control surfaces at their nominal (initial) settings.

Set the value of yaw_moment equal to the change in engine-attributable aircraft yaw-moment, and similarly set the value of pitch_moment to the change in engine attributable aircraft pitch-moment, when the or each engine of the first engine group is changed from its nominal (initial) fuel flow to a fuel flow corresponding to minThrust 1 and the or each engine of the second engine group is changed from its nominal (initial) fuel flow to a fuel flow corresponding to maxThrust 2 (712).

WHILE the magnitude of yaw_moment is greater than a first threshold of acceptability or the magnitude of pitch_moment is greater than a second threshold of acceptability, and using methods familiar to the skilled person:

Calculate the required FCS_settings (e.g. rudder angle, elevator angle) necessary to oppose or cancel the current values of yaw_moment and pitch_moment (714)

Calculate the FCS_drag from the required FCS_settings (714)

Keeping the thrust of the or each engine of the second engine group set to maxThrust2, find (716) a new minimum allowable thrust for the or each engine of the first engine group:

minThrust1=minThrust1NominalFCS+((FCS_drag−nominalFCSDrag)/cardinality1)

recalculate (718) the engine-attributable aircraft yaw-moment and the engine-attributable aircraft pitch-moment, given the new value of minThrust1 recalculate (718) yaw_moment and pitch_moment, being respectively the changes in engine-attributable aircraft yaw-moment and engine-attributable aircraft pitch-moment associated with the change in minThrust1 from its previous value to its most-recently-determined value.

END WHILE

Using methods familiar to the skilled person, find (720) the fuel flow corresponding to the value of minThrust1 found above. Let the result be minFuel1.

If minFuel1 corresponds to a fuel-flow that is lower than that for a flight-idle condition, then set minFuel1 to a value corresponding to flight-idle (720).

Set (722) the lower boundary for $\Delta W_1$ equal to minFuel1 minus nominalFuel1

An alternative to the above procedure may be contemplated to accommodate cases where thrust redistribution within engine groups is used to reduce or eliminate engine-attributable aircraft yaw-moment and/or engine-attributable aircraft pitch-moment in order to reduce the amount of flight control surfaces adjustment required and hence to reduce the amount of additional drag.

Additional Considerations Concerning the Lower Boundary are as Follows.

1. If, for a proposed grouping of engines into engine groups, the minimal possible lower boundary, calculated according to the above procedure, is insufficiently negative to allow the one or more engine of the first engine group to be moved into pilot-only operation, then the proposed grouping of engines into engine groups is not viable, and an alternative grouping must be considered instead.

2. If there is no grouping which, for a given flight condition, permits a value of $\Delta W_1$ that is sufficiently negative to achieve pilot-only operation, then operation according to the prior art should be implemented during that given flight condition, i.e. the engines are operated with their default or initial fuel flow $W_0$.

Having identified the upper boundary and lower boundary of the search region, we can now evaluate various search points, such as 620 in FIG. 25, within the search region, each search point being characterised by the single parameter $\Delta W_1$. The upper boundary of the search region corresponds to fuel flow rate $W_U$ while the lower boundary of the search region corresponds to fuel flow rate $W_L$.

Figure 27:
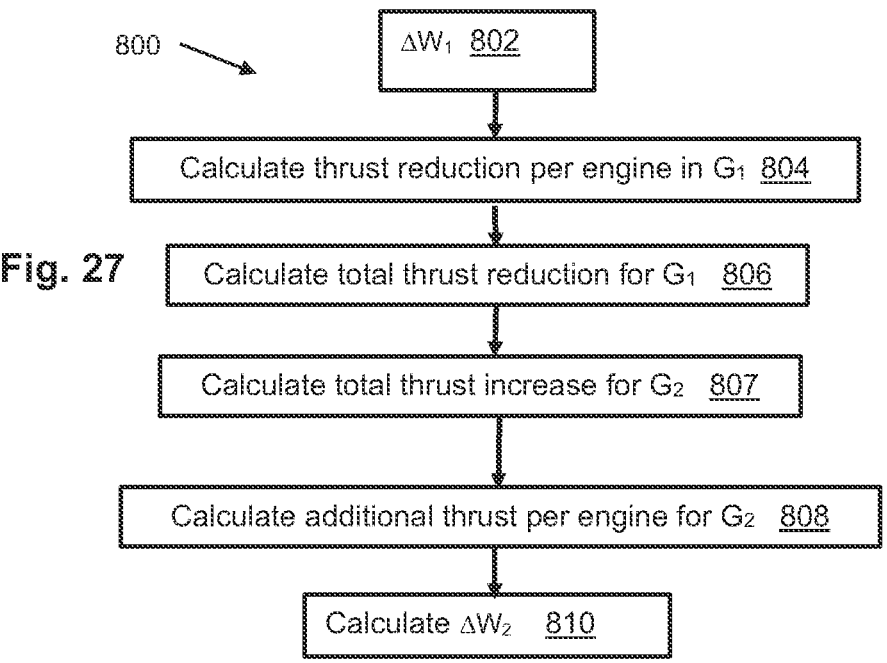
FIG. 27 shows how a change in fuel flow to each of a second group of engines may be calculated given a change in fuel flow to a first group of engines.

Referring to FIG. 27, a method of evaluating the change $\Delta W_2$ in fuel flow rate to the or each engine of the second group $G_2$ corresponding to the change $\Delta W_1$ in fuel flow rate to the or each engine of the first group $G_1$ for a given search point (such as 620 in FIG. 25) is indicated generally by 800. Starting from a candidate value of $\Delta W_1$ (802) can be calculated (804), using methods familiar to the skilled person, the corresponding reduction in thrust, relative to a nominal or default (prior art) thrust level, of the or each engine within the first engine group $G_1$ (804). This is then multiplied by the cardinality of the first engine group to give a total thrust reduction from the first engine group (806).

This is then divided by the cardinality of the second engine group $G_2$ to obtain a value for the per-engine additional thrust required from the or each engine of the second engine group (808). Using methods familiar to the skilled person, we can then calculate (810) for each engine in the second engine group a required change in fuel flow rate $\Delta W_2$ which is necessary to achieve the required per-engine additional thrust. $\Delta W_2$ will in all cases take the opposite sign to $\Delta W_1$. In other words, given that $\Delta W_1$ is by definition negative for all cases in which the present invention is operating, $\Delta W_2$ will always be positive. Due to non-linearity of thrust as a function of fuel flow rate, the magnitude of $\Delta W_2$ will in most cases differ from that of $\Delta W_1$ even if the engine grouping is symmetric and the two engine groups have the same cardinalities.

In some cases it may be necessary to adjust $\Delta W_2$ and the flight control surfaces settings to achieve a net aircraft yaw-moment whose magnitude is less than a first pre-determined threshold and/or a net aircraft pitch-moment whose magnitude is less than a second pre-determined threshold. The adjustment could be carried out iteratively using a similar process to that described above with reference to FIG. 26.

Alternatively, it may be possible to make adjustments within the second engine group i.e. to allow different engines within the same group to take different fuel flow values, in order to reduce engine-attributable aircraft yaw-moment and/or engine-attributable pitch-moment. Such adjustments would use methods familiar to the skilled person.

Evaluation of Options and Down-Selection.

Search Method.

Figure 28:
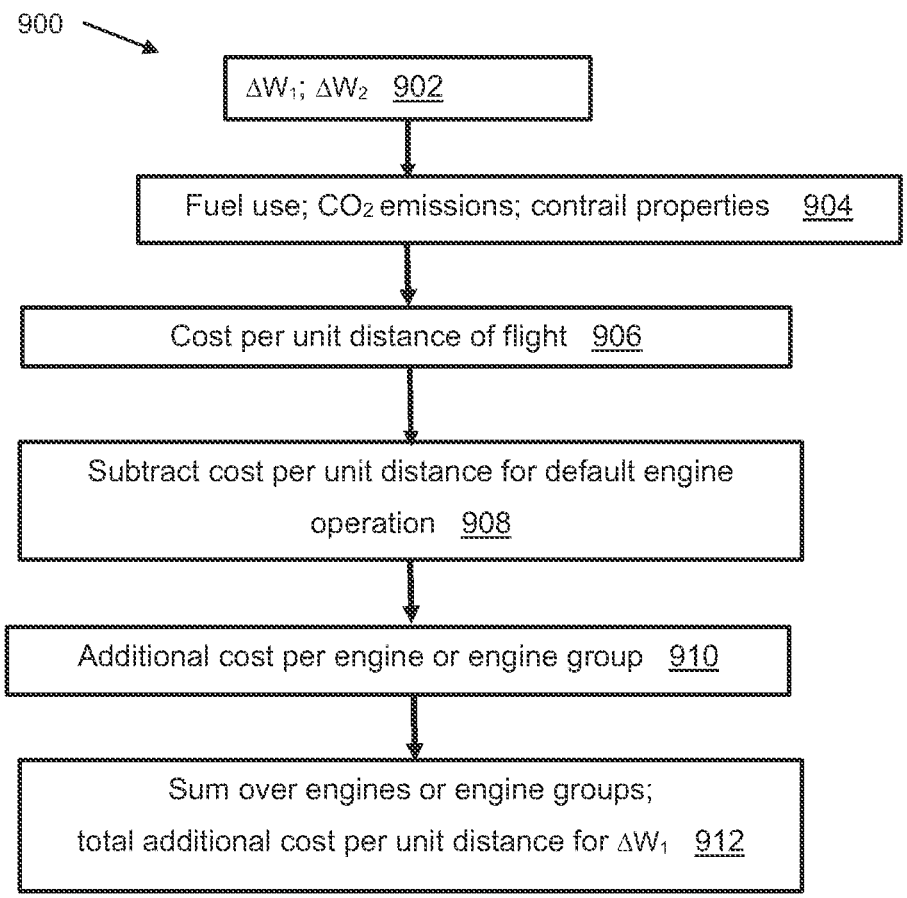
FIG. 28 shows steps in calculating a cost function for a particular grouping of engines into first and second groups, a particular value of fuel flow to each engine of the first group and a corresponding set of respective fuel flow values for engines of the second group.

For each of the possible assignments of engine to engine groups for a given aircraft (i.e. engine groupings), different values of $\Delta W_1$ within the available search region defined by the upper and lower boundaries are evaluated using the method set out below and indicated generally by 900 in FIG. 28, given current, initial or default nominal (prior art) thrust settings of engines in the first engine group.

Optionally, heuristics (e.g. learned over time or based on a priori domain knowledge) may be used to decide which engines should be assigned to the first engine group, in order to reduce computation time. For example, for the aircraft of FIG. 16 and FIG. 17, either engine may be assigned to the first engine group, with the other engine being assigned to the second engine group, and there is no need to perform mirror calculations for the opposite engine-to-engine-group assignment. The value of $\Delta W_1$ which is chosen is that is deemed most advantageous according to a fitness assessment set out below.

Assessing Each Proposed Value of $\Delta W$.

Referring to FIG. 28, for proposed values of $\Delta W_1$ and $\Delta W_2$ (902), the broad procedure is to calculate (904) for each engine or for each engine group the resulting fuel-use, $CO_2$ emissions and post-vortex contrail properties and to identify (906) the resulting costs per unit distance of flight. From each of these costs are subtracted (908) the corresponding prior art (initial or default) costs (i.e. those which would apply if $\Delta W_1$ were set to zero) to yield (910) an additional cost per engine or per engine group per unit distance of flight. A summation (912) over engines or over engine groups is then performed to yield a cost per unit distance of flight at the aircraft level of the proposed value of $\Delta$fuel1.

Figure 29:
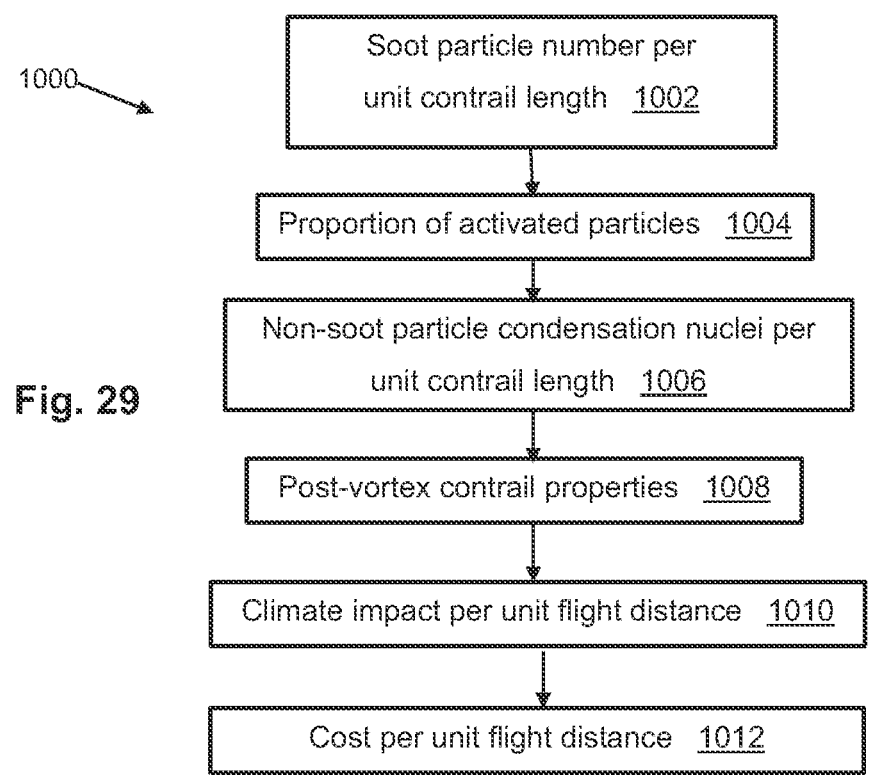
FIG. 29 shows steps in determining post-vortex contrail properties for a particular grouping of engines into first and second groups, a particular value of fuel flow to each engine of the first group and a corresponding set of respective fuel flow values for engines of the second group.

Referring to FIG. 29, a method (1000) involving the following steps may be used to calculate the post-vortex contrail properties for each engine or engine group:

Calculate (1002) the engine-specific or engine group-specific soot particle number per unit of contrail length ((fuel soot emission index*fuel flow rate $W_F$)/aircraft_airspeed) and the particle size distribution.

Calculate (1004) the engine-specific or engine group-specific proportion of soot particles which are activated as condensation nuclei using for example methods set out in Kärcher et al, 2015 (J. Geophys. Res. Atmos., 120, 7893-7927, doi:10.1002/2015JD023491) and/or in Kärcher et al, 2017 (Geophys. Res. Lett., 44, 8037-8046, doi:10.1002/2017GL074949) and/or in Bier at al, 2019, (Journal of Geophysical Research: Atmospheres, 124. https://doi. org/10.1029/2018JD029155) and hence the number of soot-originating condensation nuclei per unit of contrail length.

Calculate (1006) the number of non-soot-originating condensation nuclei per unit of contrail length using methods known to the skilled person, for example based on Kaercher et al, 2009 (Geophysical Research Letters, Vol. 36, L01804, doi:10.1029/2008GL036649, 2009).

Calculate (1008) the engine-specific or engine group-specific post-vortex contrail properties using methods known to the skilled person, for example that based on Unterstrasser et al, Atmospheric Chemistry & Physics, 10, 10003-100015 (2010)) and/or Kärcher et al, Geophysical Research Letters, 45, https://doi.org/10.1029/2018GL079391.

The post-vortex contrail properties are converted (1010) into an engine-specific or engine group-specific contrail climate impact per unit distance of flight using methods known to the skilled person, taking account of current ambient conditions and also predicted ambient conditions over the expected lifetime of the contrail, including not only atmospheric conditions but also the albedo of the underlying surface or cloud partly shielded from sunlight by the contrail. The lifetime climate impact will take account of cooling aspects of the contrail as well as warming aspects. Noting that the present invention may alter the lifetime of the contrail as well as its optical depth (as explained above), the assessment of engine-specific or engine-group-specific contrail climate impact must also take that into account, particularly if the change in lifetime relative to the prior art alters day/night ratio of the contrail"s existence.

The engine-specific or engine group-specific contrail climate impact is converted (1012) into an engine-specific or engine group-specific cost per unit distance of flight using some metric or exchange rate.

The difference between the engine-specific or engine group-specific cost per unit distance of flight of this contrail and that of the contrail that would be formed in the absence of the present invention (i.e. if $\Delta W_1$ were zero) is calculated.

The engine-specific or engine group-specific cost of additional fuel per unit distance of flight of the proposed action (relative to the fuel cost if $\Delta W_1$ was zero) is calculated, including the cost of carrying the extra fuel to the proposed location of use and including additional fuel-burn necessary to overcome flight control surfaces drag arising from correction of any engine-attributable aircraft yaw-moment and/or engine-attributable aircraft pitch-moment. Note that for some engines or engine groups, this cost could be negative due to reductions in fuel flow rate applied by the present invention.

The engine-specific or engine group-specific additional climate impact of $CO_2$ related to the additional fuel burn is calculated and converted into an additional $CO_2$ cost using a suitable metric or exchange rate. This could also be negative for some engines or engine groups.

The engine-specific or engine group-specific overall additional cost (relative to prior art (i.e. initial or default operation) per unit distance of flight is the sum of the engine-specific or engine group-specific additional contrail cost, $CO_2$ cost and fuel cost.

Optionally, additional forms of cost could be incorporated to represent reduced or increased component life usage associated with operating at lower or higher fuel flow rates and experiencing lower or higher operating temperatures (such as T40) as a result.

Optionally, additional emissions-related costs, for example related to changes in NOx emissions, could also be incorporated.

The engine-specific or engine group-specific overall additional costs per unit distance of flight over all engines or engine groups on the aircraft are summed to give a total additional cost per unit distance of flight for the entire aircraft.

The intention of the present invention is that for some combinations of engine to engine group assignments and $\Delta W_1$ values, the additional contrail cost at the aircraft level will be negative to an extent that exceeds the aircraft-level positive additional $CO_2$ cost and the aircraft-level positive additional fuel cost (and optional additional life-usage cost and/or NOx costs), leading to a negative value for the overall additional cost per unit distance of flight.

Down-Selection.

Down-selection consists simply of choosing the combination of engine to engine group assignment and $\Delta W_1$ that gives the most negative additional cost at the aircraft level per unit distance of flight.

Optionally we could apply a predetermined threshold such that if the additional cost of the selected action is insufficiently negative, it is not implemented and instead operation according to the prior art is carried out until such time as a sufficiently cost-negative action becomes available.

Optionally a further predetermined threshold could be applied such that proposed actions entailing an increase in overall fuel-flow rate for the aircraft as a whole beyond said threshold would be rejected, irrespective of the extent to which the proposed action is cost-negative. The threshold could be represented as an absolute value (change in kg/s) or as a percentage of the corresponding prior-art (initial or default) fuel flow rate.

Recalculation.

The processing described above with reference to FIGS. 24 to 29 is repeated to adapt operation of the engines to changing conditions. Any of the following options may be implemented for repeating the processing:

(i) Continuous processing—i.e. re-perform calculations as soon as previous calculations have finished;

(ii) Repeat processing after implementation—i.e. wait for implementation of the previous result to have been achieved;

(iii) Time-based repetition of processing, e.g. every minute, every ten seconds, every second;

(iv) Repetition in response to a sensed material change in conditions (such as requested thrust level, ambient temperature, ambient humidity, ambient pressure, forecasted future ambient conditions, time of day).

Implementation.

Once the above procedure has identified/selected a suitable choice of engine to engine group assignment and a suitable value of $\Delta W_1$, the corresponding parameter $\Delta W_2$ is already known or can easily be recalculated. The corresponding engine control parameters (such as thrust or a proxy for thrust such as low-pressure spool speed or compressor delivery temperature) are also known or can easily be recalculated.

Implementation of the engine control parameter values can then be instructed by the control and decision-making unit (140, 240, 340, 440, 540). Specifically, the values received by the control and decision-making unit 140, 240, 340, 440, 540 from the cockpit 118, 218, 318, 418, 518 would be modified by the control and decision-making unit 140, 240, 340, 440, 540 before being passed on to each engine.

Flight Planning.

The above describes decision making and control that could be implemented from moment to moment throughout a flight. However, since operation of the present invention may entail additional fuel burn, it would be advantageous to gain an assessment of the likely additional fuel requirement for a flight when loading fuel prior to flight.

Accordingly, the above decision-making procedure could be carried out in advance of a flight, using anticipated or forecast data for ambient conditions, weather etc in combination with flight-plan details concerning a proposed route and altitude profile, in order to produce a script of actions to be taken by the present invention for each part of the flight.

As a result, the additional fuel requirement can be calculated. Optionally, by applying different values of the predetermined threshold for fuel-flow rate changes at the aircraft level, and/or by applying different values for the predetermined threshold for the extent to which a proposed action is cost-negative, the most advantageous distribution of additional fuel use across different parts of the proposed flight can be determined, in other words the best "script" would be identified by repeating the calculations with different thresholds. Any proposed script that entails an unacceptable level of additional fuel usage during a proposed flight, for example rendering the proposed flight unachievable taking account of required safety margins, would be rejected.

A Simplified Decision-Making Framework: Introduction.

This section sets out a simplified version of the above decision-making scheme that could be employed to obtain some of the potential value of the invention but without much of the complexity described above.

However, first we must consider contrail lifetimes, with a view to understanding whether or not contrails modified by the present invention could be so long lived as to span both day and night.

Gierens et al, 2018 ("*Statistical analysis of contrail lifetimes from a satellite perspective*", Meteorologische Zeitschrift Vol. 27 No. 3 (2018), p. 183-193, https://dx-.doi.org/10.1127/metz/2018/0888) presents an analysis of contrail lifetimes in the North-Atlantic and European regions, showing that only a very small proportion of contrails have lifetimes exceeding about 10-15 hours, even after accounting for parts of the contrail lifecycle in which satellite observations of the contrail are not possible due to small width (young contrail) or poor contrast against the background (old contrail). This result shows that the notion of targeting action to a particular contrail on the basis of whether it will be a predominantly daytime contrail or a predominantly night-time contrail is feasible. Furthermore, the study is based on data spanning August 2008 to July 2009 (Vázquez-Navarro et al, 2015, Atmos. Chem. Phys., 15, 8739-8749, 2015, https://doi.org/10.5194/acp-15-8739-2015) and so can be assumed to contain data arising from aircraft with predominantly (perhaps exclusively) rich-burn combustion systems.

The primary aim of the present invention is to move the combustor operation of one or more engines from a "pilot-plus-mains" mode characterised by very low soot emissions to a "pilot-only" mode characterised by soot emissions similar to those of a rich-burn combustion system. Thus the results of Gierens et al, 2018, may be assumed to be broadly representative of the lifetimes of contrail(s) produced in the present invention by engine(s) of the first engine group when a contrail-enhancement action has been applied to said engine(s). Gierens et al, 2018 also concludes that night-time contrails have a slightly shorter lifetimes than daytime contrails.

In other parts of the atmosphere, contrail lifetimes could be different, but it is reasonable to assume that an analysis similar to that performed for the North-Atlantic/Europe region in [Gierens et al, 2018] could also be performed for other parts of the world, given suitable satellite data.

Based on the above, a simple lookup table can be constructed which details for each region of the world a contrail lifetime threshold. A contrail lifetime threshold would be selected as being representative of the maximum likely lifetime of a contrail produced following contrail-enhancement according to the present invention (i.e. increasing soot emissions when $T_{AMB} > T_{TRANS}$).

For example, from a cumulative distribution of contrail lifetimes derived as per analysis described above, the selected value could be representative of a contrail lifetime above which only 1% or 5% or 10% or 20% of contrails reach.

A corresponding lookup table could be constructed to represent the maximum likely lifetime of a contrail produced following contrail-reduction according to the present invention (i.e. increasing soot nvPM number to minimise contrail optical depth when $T_{AMB} \leq T_{TRANS}$).

Using the contrail lifetime threshold relevant to a particular region of operation of an aircraft, and using knowledge of when the next transition from day to night or night to day would take place at the aircraft"s current location, one could determine whether or not a contrail modified by the present invention, during its formation at a particular time, would exist primarily during the day or during the night.

In a very simple example, contrail enhancement (i.e. increasing of contrail optical depth) would be permitted only during the first few hours of a day, in order to allow time for the contrail to exert a net cooling effect during the day but without the contrails lifetime continuing substantially into the night-time (recalling that in an absence of sunlight, the effect of the contrail is disadvantageously exclusively warming).

Conversely, in the same simple example, contrail reduction (possible when $T_{AMB} \leq T_{TRANS}$) would be attempted only during the early to middle part of the night, in order that the invention does not reduce the cooling effect of daytime contrails.

Thus, a daytime window of opportunity can be defined that starts at daybreak (or shortly before) and ends at the following nightfall minus the contrail lifetime threshold applying to daytime contrails at the location of contrail formation.

Similarly, a night-time window of opportunity can be defined that starts at nightfall (or shortly before) and ends at the following daybreak minus the contrail lifetime threshold applying to night-time contrails at the location of contrail formation.

In both cases daybreak and nightfall are calculated with respect to the time of year and the location at which the contrail is formed. In a simple example it may be assumed that any drifting of the contrail during its few-hours long lifetime will not materially affect daybreak and nightfall.

A Simplified Decision-Making Framework: Pseudocode.

The simplified decision-making framework described above may be implemented by the following algorithm:
Calculate windows of opportunity and determine whether the current time falls within one of those windows.
IF not in a window of opportunity, or if ambient RHw<100%, THEN
Select $\Delta W_1=0$
ELSE IF in a night-time window of opportunity THEN
IF ($T_{AMB}>T_{TRANS}$) THEN
Select $\Delta W_1=0$
If ($T_{AMB}>T_{TRANS}$) then
FOR each of the relevant engine groupings for contrail reduction (see below):
Select value of $\Delta W_1$ which minimises contrail optical depth (with reference to FIG. 2 and FIG. 4), subject to constraints on achievable thrust in the second engine group.
Choose the engine grouping (and the corresponding $\Delta$fuel1) that gives the best outcome (lowest contrail optical depth)
ELSE IF in a daytime window of opportunity THEN
FOR each of the relevant engine groupings for contrail enhancement (see below)
Select value of $\Delta W_1$ which maximises contrail optical depth (with reference to FIG. 2 and with reference to whichever part of FIG. 3 or FIG. 4 applies at the prevailing ambient temperature), subject to constraints on achievable thrust in the second engine group.
Choose the engine grouping (and the corresponding $\Delta W_1$) that gives the best outcome (highest contrail optical depth)
ENDIF
IF there is not a value of $\Delta W_1$ which satisfies all the necessary constraints and provides a level of benefit which exceeds a pre-determined threshold, set $\Delta W_1$ to zero.
IF the value of $\Delta W_1$ for the chosen engine grouping is negative THEN
calculate the corresponding $\Delta W_2$ and (if relevant) flight control surfaces setting, using methods known to the skilled person.
Implement the values of $\Delta W_1$, $\Delta W_2$ and flight control surfaces setting for the selected engine grouping.

A Simplified Decision-Making Framework: Selecting an Engine Grouping.

An engine grouping for the simplified decision-making framework may be made as follows.
Choose Table 1, Table 2 or Table 3 above according to the number of engines on the aircraft.
From each relevant row of the selected table, choose at random one of the available options, unless the aircraft is currently implementing one of those options, in which case the currently-implemented option should be chosen.
For a 2-engined aircraft there is only one row in the corresponding table
For 3-engined and 4-engine aircraft, relevant rows can be identified as follows:
For contrail reduction when ambient RHi is modestly greater than 100% (for example less than 110 or 120%) select "inboard" engine groupings
For contrail reduction when ambient RHi is high (for example greater than 120% or 130%) select "outboard" engine groupings
For contrail enhancement when ambient RHi is modestly greater than 100% (for example less than 110% or 120%) select "inboard" engine groupings
For contrail enhancement when ambient RHi is high (for example greater than 120% or 130%) select "outboard" engine groupings.

The invention claimed is:

1. In an aircraft comprising a set of lean-burn gas turbine engines each operating in a pilot-plus-mains mode with a given initial fuel flow, a method of controlling the optical depth of contrails produced by at least one first engine, the method comprising the steps of:
(i) reducing fuel flow to the at least one first engine to change the operation of the at least one first engine from the pilot-plus-mains mode to a pilot-only mode; and
(ii) adjusting fuel flow to one or more second engines such that the total fuel flow to the one or more second engines is increased, all of the one or more second engines remaining in the pilot-plus-mains mode,
wherein the set of lean-burn gas turbine engines consists of the at least one first engine and the one or more second engines.

2. The method of claim 1, wherein steps (i) and (ii) are carried out such that the total thrust and aircraft pitch- and yaw-moments produced by the set of lean-burn gas turbine engines are conserved.

3. The method of claim 2, wherein the set of lean-burn gas turbine engines of the aircraft consists of a sub-set of inboard engines and a sub-set of outboard engines, each engine of the at least one first engine being a respective inboard engine of the sub-set of inboard engines and each engine of the one or more second engines being a respective outboard engine of the sub-set of outboard engines, and
steps (i) and (ii) are carried out when the relative humidity over ice of air through which the aircraft is flying is between 100% and 120%.

4. The method of claim 2, wherein the set of lean-burn gas turbine engines of the aircraft consists of a sub-set of inboard engines and a sub-set of outboard engines, each engine of the at least one first engine being a respective outboard engine of the sub-set of outboard engines and each engine of the one or more second engines being a respective inboard engine of the sub-set of inboard engines, and
steps (i) and (ii) are carried out when the relative humidity over ice of air through which the aircraft is flying is at least 120%.

5. The method of claim 2, wherein the set of lean-burn gas turbine engines of the aircraft consists of a sub-set of inboard engines and a sub-set of outboard engines, each engine of the at least one first engine being a respective outboard engine of the sub-set of outboard engines and each engine of the one or more second engines being a respective inboard engine of the sub-set of inboard engines, and wherein steps (i) and (ii) are carried out when the relative humidity over ice of air through which the aircraft is flying is at least 130%.

6. The method of claim 1, wherein steps (i) and (ii) are carried out such that at least one of a change in aircraft yaw-moment and a change in aircraft pitch-moment is produced by the set of lean-burn gas turbine engines and the method further comprises the steps of:
(iii) adjusting one or more flight control surfaces of the aircraft to compensate for the at least one of the change in aircraft yaw-moment and the change in aircraft pitch-moment produced by the set of lean-burn gas turbine engines; and
(iv) adjusting the total thrust produced by the set of lean-burn gas turbine engines to compensate for any change in aircraft drag resulting from carrying out step (iii) in order to maintain the forward velocity of the aircraft.

7. The method of claim 6, wherein the set of lean-burn gas turbine engines of the aircraft consists of a sub-set of inboard engines and a sub-set of outboard engines,
steps (i) and (ii) respectively are carried out by:
(a) reducing fuel flow to a single engine of the at least one first engine to change the operation of the single engine of the at least one first engine from the pilot-plus-mains mode to the pilot-only mode, and
(b) adjusting the fuel flow to each engine of the one or more second engines such that the total fuel flow to the one or more second engines is increased,
the single engine of the at least one first engine is an inboard engine of the sub-set of inboard engines and every engine within the set of lean-burn gas turbine engines other than the single engine of the at least one first engine is an engine of the one or more second engines, and
steps (i) and (ii) are carried out when the relative humidity over ice of air through which the aircraft is flying is either (a) between 100% and 120% or (b) at least 120%.

8. The method of claim 6, wherein the set of lean-burn gas turbine engines of the aircraft consists of a sub-set of inboard engines and a sub-set of outboard engines,
steps (i) and (ii) respectively are carried out by:
(i) reducing the fuel flow to a single engine of the at least one first engine to change the operation of the single engine of the at least one first engine from the pilot-plus-mains mode to the pilot-only mode, and
(ii) adjusting the fuel flow to each engine of the one or more second engines such that the total fuel flow to the one or more second engines is increased,
the single engine of the at least one first engine is an outboard engine of the sub-set of outboard engines and every engine within the set of lean-burn gas turbine engines other than the single engine of the at least one first engine is a second engine an engine of the one or more second engines, and
steps (i) and (ii) are carried out when the relative humidity over ice of the air through which the aircraft is flying is at least 120%.

9. The method of claim 6, wherein the set of lean-burn gas turbine engines consists of a single at least one first engine and a single one or more second engine; each engine being mounted on a respective lateral side of the aircraft, the engines being substantially equidistant from the central longitudinal axis of the aircraft.

10. The method of claim 6, wherein the set of lean-burn gas turbine engines of the aircraft consists of a sub-set of inboard engines and a sub-set of outboard engines and steps (i) and (ii) respectively are carried out by:
(i) reducing fuel flow to a single engine of the at least one first engine to change the operation of the single engine of the at least one first engine from the pilot-plus-mains mode to the pilot-only mode; and
(ii) adjusting the fuel flow to each engine of the one or more second engines such that total fuel flow to the one or more second engines is increased,
wherein the single engine of the at least one first engine is an inboard engine and every engine within the set of lean-burn gas turbine engines other than the single engine of the at least one first engine is an engine of the one or more second engines and wherein steps (i) and (ii) are carried out when the relative humidity over ice of air through which the aircraft is flying is at least 130%.

11. The method of claim 6, wherein the set of lean-burn engines of the aircraft consists of a sub-set of inboard engines and a sub-set of outboard engines, and steps (i) and (ii) respectively are carried out by:
(i) reducing the fuel flow to a single engine of the at least one first engine to change the operation of the single engine of the at least one first engine from the pilot-plus-mains mode to the pilot-only mode; and
(ii) adjusting the fuel flow to each engine of the one or more second engines such that the total fuel flow to each engine of the one or more second engines is increased,
wherein the single engine of the at least one first engine is an outboard engine and every engine within the set of lean-burn gas turbine engines other than the single engine of the at least one first engine is an engine of the one or more second engines and wherein steps (i) and (ii) are carried out when the relative humidity over ice of air through which the aircraft is flying is at least 130%.

12. The method of claim 1, further comprising the step of determining the set of all possible engine groupings, each grouping being one way of designating one or more of the lean-burn gas turbine engines as the at least one first engine and the remaining lean-burn gas turbine engines as the one or more second engines, and for each engine grouping:
   (a) determining or selecting an upper limit and a lower limit for the fuel flow to each engine of the at least one first engine to be implemented upon carrying out step (i), the upper limit being less than or equal to a fuel flow corresponding to a fuel staging point of the set of lean-burn gas turbine engines;
   (b) determining or selecting a set of fuel flow values for the at least one first engine, the set of fuel flow values including the upper and lower limits and a plurality of values lying between the upper and lower limits;
   (c) for each fuel flow value determined or selected in step (b) determining a respective fuel flow value for each engine of the one or more second engines such that a given fuel flow value for the each engine of the at least one first engine and a corresponding set of respective fuel flow values for each of the one or more second engines provide for the forward velocity of the aircraft to be maintained if implemented in steps (i) and (ii) together with adjustment of one or more flight control surfaces of the aircraft if necessary;
   (d) for each fuel flow value in the set of fuel flow values for the at least one first engine determined or selected in step (b), and the corresponding respective fuel flow values for the one or more second engines determined in step (c), calculating the value of a cost function based on the fuel use and $CO_2$ emissions of the set of lean-burn gas turbine engines and the climate impact of contrails produced by the set of lean-burn gas turbine engines per unit flight distance; and
   (e) determining the fuel flow value of the at least one first engine, and the corresponding respective fuel flow values for the one or more second engines resulting in the smallest value of the cost function for the engine grouping under consideration and storing data corresponding to that engine grouping and those fuel flows values;
   and subsequently (f) selecting and implementing in steps (i) and (ii) the engine grouping, the fuel flow value of the at least one first engine, and the corresponding set of fuel flow values for the one or more second engines, together with any corresponding adjustment of one or more flight control surfaces of the aircraft, which result in the lowest cost function value.

13. The method of claim 12, wherein the lower limit for the fuel flow to each engine of the at least one first engine for a given engine grouping is determined by the steps of:
   (a) determining the maximum thrust per engine which can be provided by the one or more second engines and the corresponding maximum thrust which can be provided by the one or more second engines;
   (b) determining the minimum thrust which would need to be provided by the at least one first engine in order to maintain the forward velocity of the aircraft if the maximum thrust determined in step (a) were to be implemented, and the corresponding thrust per engine of the at least one first engine;
   (c) calculating an engine-attributable aircraft yaw-moment and an engine-attributable aircraft pitch-moment which would result from implementing the thrusts per engine determined in steps (a) and (b); and
   (d) setting a value of total aircraft yaw-moment equal to the engine-attributable yaw-moment and a value of total aircraft pitch-moment equal to the engine-attributable pitch-moment;
   and while the total aircraft yaw-moment and/or aircraft pitch-moment calculated in step (d) exceeds a predetermined threshold:
   (e) calculating a required flight control surfaces setting necessary to achieve substantially zero total aircraft yaw-moment and substantially zero total aircraft pitch-moment and a corresponding value of flight control surfaces drag;
   (f) determining a new minimum thrust per engine of the at least one first engine required to maintain the velocity of the aircraft taking into account the flight control surfaces drag; and
   (g) re-calculating the engine-attributable aircraft yaw-moment and the engine-attributable aircraft pitch-moment based on the new minimum thrust determined in step (f);
   (h) calculating the total aircraft yaw-moment based on the engine-attributable aircraft yaw-moment and the total aircraft pitch-moment based on the engine-attributable pitch-moment determined in step (g) and the flight control surfaces drag;
   and subsequently determining a fuel flow rate corresponding to the minimum thrust per engine of the at least one first engine finally determined in step (f) and setting the lower limit equal to that fuel flow rate.

14. The method of claim 12, wherein the value of the lower limit is one of:
   (a) a predetermined fixed value or a pre-determined percentage of the initial fuel flow to each engine of the set of lean-burn gas turbine engines;
   (b) a value which is a pre-determined function of the initial fuel flow to each engine of the set of lean-burn gas turbine engines;
   (c) a value consistent with a pre-determined minimum level of operation of the at least one first engine; and
   (d) a value based on the number of the at least one first engine and the number of the one or more second engines and a maximum tolerable fuel flow for the one or more second engines which ensures that a maximum operating temperature or spool speed is not exceeded for the one or more second engines.

15. The method of claim 12, wherein the upper limit is a pre-determined percentage of the fuel flow corresponding to a fuel staging point of the set of lean-burn gas turbine engines.

16. The method of claim 12, wherein the step of calculating the value of the cost function based on the fuel use and $CO_2$ emissions of the set of lean-burn gas turbine engines and the climate impact of contrails produced by the set of lean-burn gas turbine engines per unit flight distance for a given engine grouping, a given fuel flow value for the at least one first engine and a corresponding set of fuel flow values for the one or more second engines comprises the steps of:
   (a) calculating for either (i) each engine of the at least one first engine and each engine of the one or more second engines, or (ii) the at least one first engine as a whole and the one or more second engines as a whole, the soot particle number per unit contrail length for an engine, or, as the case may be, a number of engines as a whole;

(b) for either (i) each engine of the at least one first engine and each engine of the one or more second engines, or (ii) the at least one first engine as a whole and the one or more second engines as a whole, calculating the proportion of soot particles produced by an engine or, as the case may be, a number of engines as a whole, which are activated as condensation nuclei;

(c) calculating the number of non-soot originating condensation nuclei per unit contrail length for the at least one first engine and the one or more second engines;

(d) for either (i) each engine of the at least one first engine and each engine of the one or more second engines, or (ii) the at least one first engine as a whole and the one or more second engines as a whole, calculating a post-vortex contrail property of contrails produced by an engine, or, as the case may be, a number of engines as a whole; and (e) converting each post-vortex contrail property into a corresponding climate impact per unit distance of flight using a metric or exchange rate.

17. The method of claim 12, wherein fuel flows to the at least one first engine and the one or more second engines are adjusted to either:

(a) enhance the optical depth of contrails produced by the at least one first engine only during a period between the start-time of a daylight period and a time equal to the end-time of the daylight period minus a pre-determined maximum likely lifetime of an enhanced contrail; or (b) reduce the optical depth of contrails produced by the at least one first engine only during a period between the end-time of a daylight period and a time equal to the start-time of the next daylight period minus a pre-determined maximum likely lifetime of a reduced contrail.

18. The method of claim 12, wherein steps (a) to (e) are repeated:

(i) continuously;

(ii) after a particular engine grouping, a particular fuel flow rate for the at least one first engine and a corresponding set of respective fuel flow rates for the one or more second engines have been implemented in step (f);

iii) after elapse of a pre-determined time period; or (iv) following a change in at least one of requested thrust level, ambient temperature, ambient humidity, forecast ambient atmospheric conditions and time of day, the magnitude of the change exceeding a pre-determined threshold value; and a new combination of engine grouping, fuel flow for the at least one first engine and corresponding set of respective fuel flow rates for the one or more second engines implemented in step (f) if that combination has a lower cost function than a cost function of a currently-implemented combination of engine grouping, fuel flow for the at least one first engine and corresponding set of fuel flows for the one or more second engines.

19. A propulsion system for an aircraft, the system comprising:

(i) a set of lean-burn gas turbine engines, the set consisting of at least one first engine and at least one second engine;

(ii) a fuel metering system arranged to adjust fuel flow to each of the lean-burn gas turbine engines;

(iii) a sensing system arranged to sense the temperature and relative humidity over ice of air through which the aircraft may fly and generate corresponding first data; and (iv) a controller configured to execute the steps of (a) receiving the first data from the sensing system and second data corresponding to an initial thrust level for each engine of the set individually or all engines of the set collectively, and (b) carrying out processing using the first and second data and providing control signals to the fuel-metering system either directly, or via a plurality of engine electronic controllers each of which is arranged to control a respective engine of the set of lean-burn gas turbine engines, such that the control signals effect control of the optical depth of contrails produced by the at least one first engine by:

(1) reducing fuel flow to each engine of the at least one first engine to change the operation of each engine of the at least one first engine from a pilot-plus-mains mode to a pilot-only mode, and (2) adjusting fuel flow to one or more of the at least one second engine such that the total fuel flow of the at least one second engine is increased, all of the at least one second engine remaining in the pilot-plus-mains mode.

20. The aircraft comprising the propulsion system according to claim 19.

* * * * *